(12) United States Patent
Yui

(10) Patent No.: US 6,795,125 B2
(45) Date of Patent: Sep. 21, 2004

(54) TELEVISION SIGNAL RECEPTION APPARATUS

(75) Inventor: Hideaki Yui, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 485 days.

(21) Appl. No.: 09/939,596

(22) Filed: Aug. 28, 2001

(65) Prior Publication Data

US 2002/0057382 A1 May 16, 2002

(30) Foreign Application Priority Data

Aug. 31, 2000 (JP) ........................................ 2000/263858

(51) Int. Cl.[7] .......................... H04N 5/45; H04N 5/445; H04N 5/50
(52) U.S. Cl. ..................... 348/564; 348/732; 348/565
(58) Field of Search ................................. 348/565–568, 348/564, 731–733, 594–595; H04N 5/50, 5/45, 5/445

(56) References Cited

U.S. PATENT DOCUMENTS

| | | | | |
|---|---|---|---|---|
| 5,398,074 A | * | 3/1995 | Duffield et al. ............. | 348/564 |
| 5,754,253 A | * | 5/1998 | Lee ............................ | 348/565 |
| 5,867,227 A | * | 2/1999 | Yamaguchi .................. | 725/56 |
| 5,886,746 A | * | 3/1999 | Yuen et al. ................. | 348/564 |
| 2003/0016304 A1 | * | 1/2003 | Norsworthy et al. ........ | 348/565 |

FOREIGN PATENT DOCUMENTS

JP          10-51709          2/1998

* cited by examiner

Primary Examiner—Michael H. Lee
(74) Attorney, Agent, or Firm—Fitzpatrick, Cella, Harper & Scinto

(57) ABSTRACT

The present invention presents an apparatus for receiving a television signal having a plurality of channels, assigning images of different channels included in the television signal to a main picture and a sub-picture, and synthesizing the main picture and the sub-picture in a same picture and displaying the synthesized pictures by a display apparatus, characterized in that in response to an instruction for a channel change of the sub-picture, the channel on the sub-picture is changed from a first channel to a second channel while an image from the first channel displayed on the sub-picture and an image from the second channel are synthesized within a predetermined duration of time.

15 Claims, 13 Drawing Sheets

TELEVISION SIGNAL RECEPTION APPARATUS

BACKGROUND OF THE INVENTION

1. Field of the Invention

The present invention relates to a television signal reception apparatus, and particularly to picture control for receiving television broadcast programs of a plurality of channels.

2. Related Background Art

Among reception apparatuses for performing picture displays of received television broadcasts, there is known a television apparatus which is configured so as to display a main picture together with a plurality of sub-pictures which the apparatus displays either within this main picture or outside of this main picture. Further, by divided up and controlling a single tuner in a time division manner and performing a display of semi-moving images by switching between them and displaying in rotation, practical application is made of a multi-picture television apparatus or the like in which the number of sub-pictures is increased to that of broadcast programs (i.e., number of channels). One instance of a television apparatus which has a function such as this is disclosed in Japanese Patent Application Laid-Open No. 10-51709, for example.

Further, in relation to digital television broadcasting that is now anticipated as the technology to replace analog broadcasting in the future, in order to adapt to the change to multiple-channel broadcasting, a new program channel-selecting method which is called EPG (electronic program guide) has been put to practical use. In this method, program information multiplexed in a digital television broadcast is extracted and then displayed on a screen, and then program selection is performed from this display.

However, there were the following problems in the conventional reception apparatus, such as the one described above, in which a multi-picture which makes divisions of sub-pictures according to the number of programs is displayed:

(1) Processing of analog broadcasting with several tens of channels was possible, but the sub-picture divisions could not be increased in units of hundreds, which is necessary for digital broadcasting in which the number of channels is planned to increase into the hundreds;

(2) The more the number of sub-picture divisions increases the lower the display resolution of each of the sub-pictures becomes, so visual recognizability deteriorates;

(3) Even if the display is performed with the number of sub-picture divisions being decreased, it is difficult for the user to know which picture was changed when he or she quickly changes the program of one of the sub-pictures;

(4) In the case where the user has a clear objective when searching for a program, or in the case where the user is accustomed to computer operation the EPG program selection method for selecting from digital television broadcasts is an extremely good method. However, in the case where the user wants to select a program which suits his or her interest at that time while casually viewing the screen, or in the case where the user is not accustomed to computer operation, the same ease of operation as enjoyed with the conventional analog broadcast reception apparatus cannot be achieved, which may present a great barrier to the spread of digital broadcasting.

SUMMARY OF THE INVENTION

The present invention was developed to solve problems such as those described above.

Another objective of the present invention is to provide a display picture which is easy for a user to view at a time when a television broadcast having many channels is received.

A further objective of the present invention is to make the programs of many channels be viewable with efficiency at a time when a multiple-channel television broadcast is received.

A further objective of the present invention is to improve the operability of the program channel selection by the user or the like.

With the objects as described above, according to one aspect of the present invention, there is provided, an apparatus for receiving a television signal having a plurality of channels, assigning images of different channels included in the television signal to a main picture and a sub-picture, and synthesizing the main picture and the sub-picture in a same picture and displaying the synthesized pictures by a display apparatus, the apparatus comprising reception means for receiving the television signal; and control means for, according to an instruction for a channel change of the sub-picture, synthesizing an image of a first channel displayed as the sub-picture, and an image of a second channel within a predetermined duration of time, while changing the channel of the sub-picture from the first channel to the second channel.

Objectives of the present invention other than the ones recorded above, and other characteristics of the same, ought to become clear in the following detailed explanation of an embodiment of the present invention taken in conjunction with the accompanied drawings.

DETAILED DESCRIPTION OF THE PREFERRED EMBODIMENTS

Hereinafter, explanation will be made of an embodiment of the present invention, making reference to the drawings.

Figure 1:
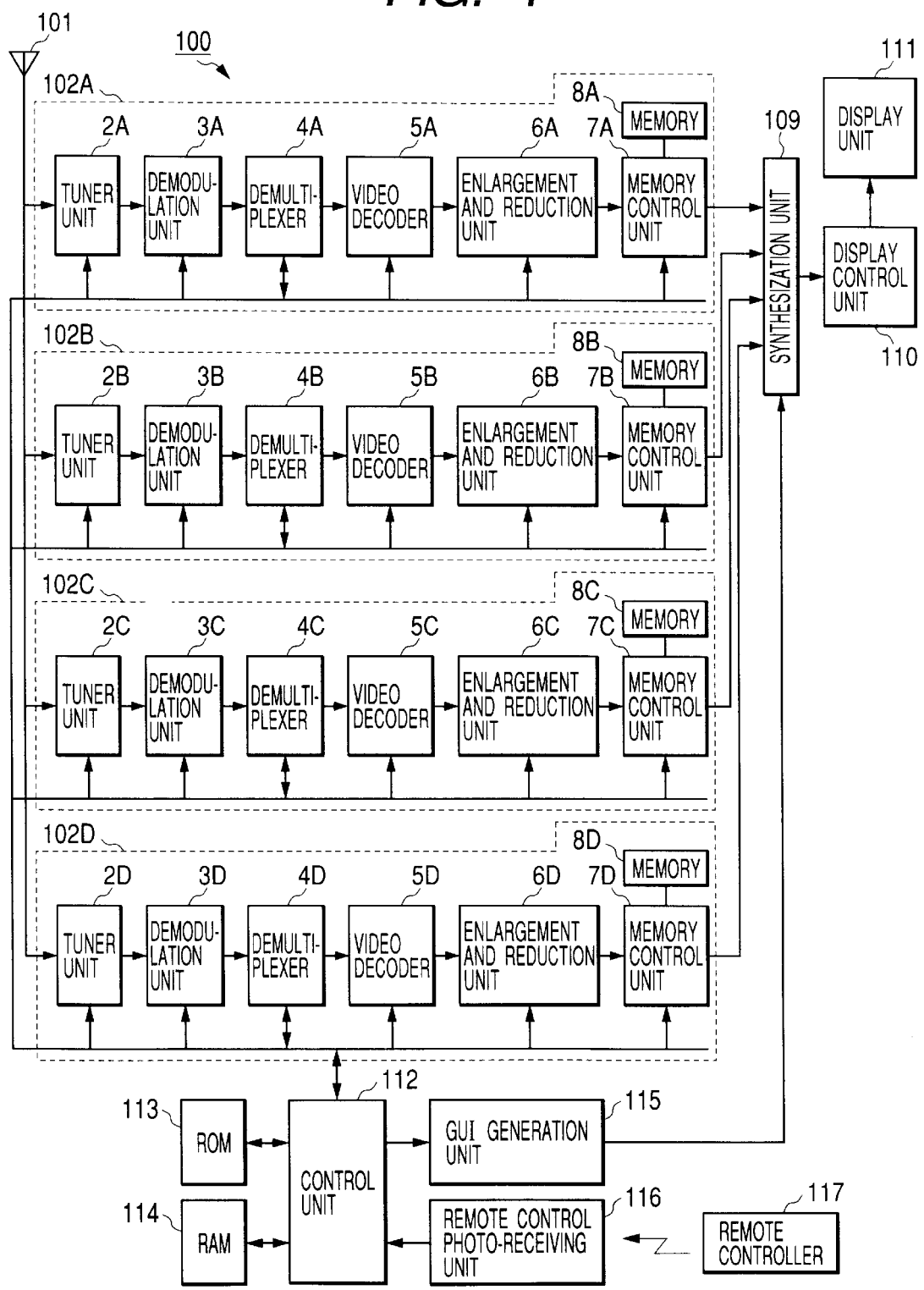
FIG. 1 is a block diagram depicting a construction of a reception apparatus in which the present invention has been applied, according to a first embodiment.

Explanation will now be made of a first embodiment in which the present invention is applied to a digital television broadcast reception apparatus 100 as shown in FIG. 1, for example. The reception apparatus 100 of this embodiment is constructed in such a way that it can arrange images of independent programs from a plurality of channels in a single picture based on a predetermined layout, and perform a synthesized display thereof in a single display unit 111.

General Construction of the Reception Apparatus 100

As shown in FIG. 1, the reception apparatus 100 has an antenna 101 for receiving digital broadcast waves; a plurality of video processing units 102A, 102B, 102C and 102D for obtaining image data of a desired channel received by the antenna 101; a GUI generation unit 115 for generating OSD (On Screen Display) data as a GUI (Graphical User Interface); a synthesization unit 109 for synthesizing image data obtained with the video processing units 102A, 102B, 102C and 102D and the OSD data obtained with the GUI generation unit 115; a display control unit 110 for performing control for the display at a display unit 111 of an image which is based on the synthesized image data obtained by means of the synthesization unit 109; a remote control photo-receiving unit 116 for receiving a command from a remote controller 117; a control unit 112 that is a CPU or the like which governs the operations controls of the entire reception apparatus 100 in accordance with, for example, the commands received from the remote control photo-receiving unit 116; a RAM 114 to be used as a working memory or the like by the control unit 112; and a ROM 113 storing a processing program to be executed by the control unit 112 to attain its operation controls, for example.

Further, the plurality of video processing units 102A, 102B, 102C and 102D each have a similar construction. For example, the video processing unit 102A includes a tuner portion 2A, a demodulation portion 3A, a demultiplexer 4A, an video decoder 5A, an enlargement and reduction unit 6A, a memory control unit 7A and a memory 8A; and data outputted from the memory control unit 7A is provided to the synthesization unit 109.

In this embodiment there are provided four video processing units 102A to 102D, but it is also possible that five or more video processing units are provided. Further, the plurality of video processing units 102A to 102D have similar constructions and operations; therefore, explanation will be made hereinafter of a specific construction and operation of the video processing unit 102A, but explanations of the other video processing units will be abbreviated.

The antenna 101 is a parabola antenna, for example, and receives BS digital television broadcast waves and CS digital television broadcast waves. In this embodiment a satellite broadcast is used as an example of the digital television broadcast that is received; however, the present invention is not limited to only this example, and signals which are sent through ground waves or optic cable or other technologies may be used.

In the video processing unit 102A, the tuner portion 2A passes the television broadcast signal received by the antenna 101 to a band-pass filter, a down converter, etc., and after that, outputs it to the demodulation portion 3A. The demodulation portion 3A performs demodulation processing which matches the transmission format, an error currection processing and the like on the television broadcast signal from the tuner portion 2A to obtain a television signal in an MPEG 2 transport stream (hereinafter, "TS") format, and then provides this to the demultiplexer 4A. The demultiplexer 4A extracts image data, audio data and added information of the MPEG 2 for the desired program (i.e., channel) from the MPEG 2 TS sent over from the demodulation portion 3A.

The MPEG 2 audio data extracted by means of the demultiplexer 4A is decoded by an audio decoder (not shown), and is outputted as an audio signal. If an amplifier and speaker are connected to this audio decoder, it is possible to listen to the audio of the program that was received.

Further, the added information of the MPEG 2 extracted by the demultiplexer 4A is provided to the control unit 112. In the case where the added information is a data broadcast which is planned to be carried out by means of a digital television broadcast, the control unit 112 interprets BML (Broadcasting Markup Language) data and obtains a structured contents scenario of the multimedia information service provider. Further, in the case where the added information is EPG information, the control unit 112 interprets PSI (Program Specific Information)/SI (Service Information) data and obtains program information (i.e., such as time of broadcast, title, category, etc.) relevant to the program to be broadcasted.

Further, image data of the MPEG 2 extracted by the demultiplexer 4A is provided to the video decoder 5A. The video decoder 5A decodes the image data of the MPEG 2 and converts it to a rasterscan-type display format, and after that, provides it to the enlargement and reduction unit 6A.

Based on the control by the control unit 112, the enlargement and reduction unit 6A performs preprocessing on the program data from the video decoder 5A by using a matrix circuit which converts the program data from a YUV color difference signal to an RGB signal, and an IP conversion circuit or such which converts the scan format from an interlace format to a progressive format, and after that, the enlargement and reduction unit 6A performs enlargement and reduction, or equal magnification processing. At this time, the control unit 112 sets the resolution conversion parameters (i.e., enlargement rate, reduction rate, enlargement/reduction weighting filter coefficient, etc.) for the enlargement and reduction unit 6A based on the display format (i.e., the number of lines in the display, number of dots, and number of colors) and the preset picture layout information.

The memory control unit 7A writes the image data received from the enlargement and reduction unit 6A into the memory 8A at the input rate (i.e., writes at the forwarding rate synchronized to the horizontal and vertical synchronization signals from the input side), and also, reads out image data from the memory 8A at the rate of output from the synthesization unit 109 described below to the display unit 111 (i.e., reads out at the display rate synchronized to the horizontal and vertical synchronization signals from the output side).

At this time, the memory control unit 7A controls the writing and reading of the image data to and from the memory 8A in completely asynchronous manner. Therefore, the control unit 112 sets the memory control parameters for the memory control unit 7A (i.e., sets a write region (i.e., address) for writing to the memory 8A, and sets a read-out region (i.e., address) for reading out from the memory 8A, for example). The memory 8A has storage capacity at least sufficient for storing the image data of one picture image to be displayed on the display unit 111.

The other video processing units 102B, 102C and 102D each process the television signal based on the instructions from the control unit 112 in a manner equivalent to that of the video processing unit 102A.

The synthesization unit 109 synthesizes the four sets of image data outputted from the memory control units 7A to 7D in the video processing units 102A to 102D which each operate independently as described above.

Specifically, as one example of this embodiment, all of the image data inputted to the synthesization unit 109 is inputted based on a timing synchronized with the horizontal and vertical synchronization signals of the display unit 111, and is constructed such that the image region indicated by the data transferred in to a frame is the same as an actual image display region in the display portion 111.

This is one method for accomplishing an objective of being able to easily superimpose the four sets of image data at the time of the synthesization. Further, the synthesization unit 109 is configured such that the data effective signal which is received together with the image data during the horizontal period can be used to enable the discrimination of the data effective area of the entire image region represented by the image data outputted from the memory control units 7A to 7D.

Figure 2:
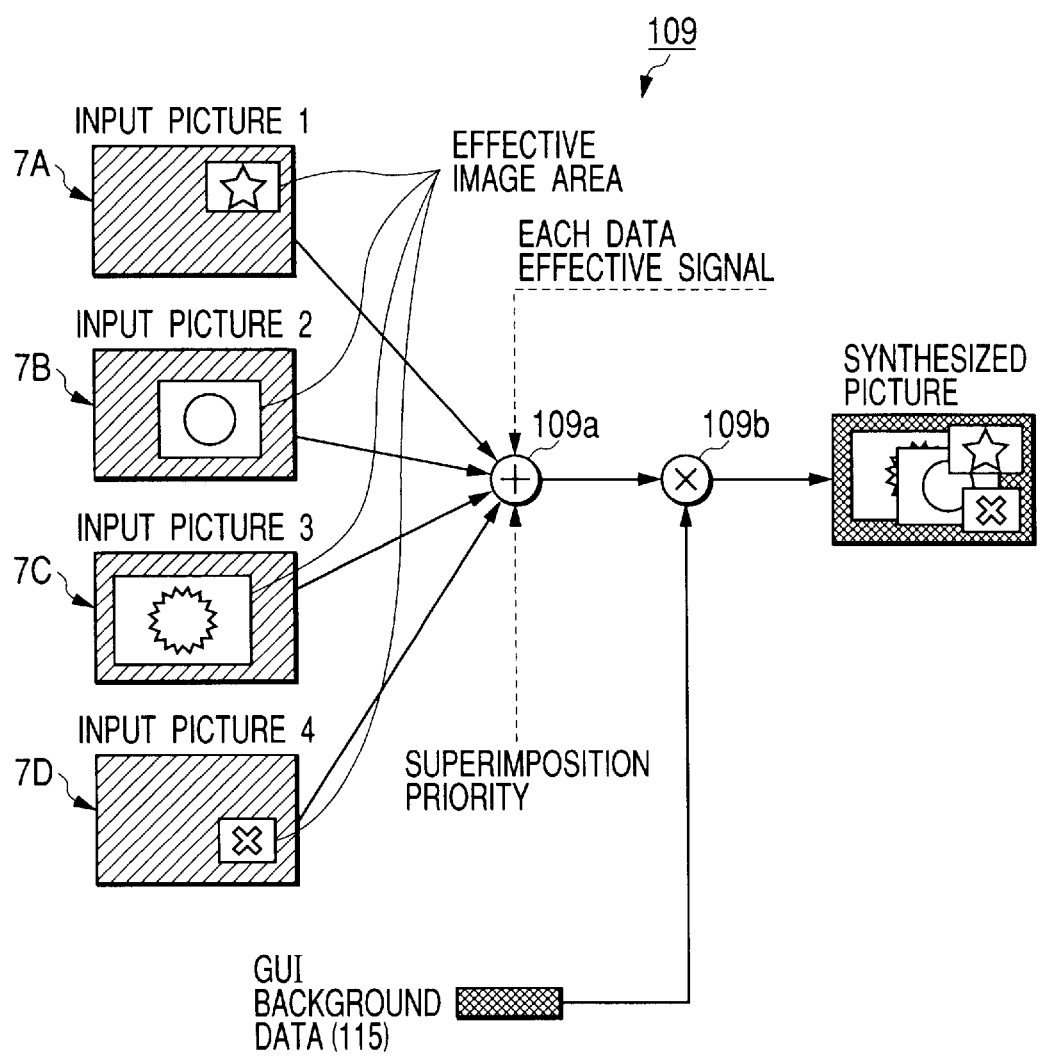
FIG. 2 is a diagram for explaining a construction of a synthesization unit of the reception apparatus according to the embodiment of the present invention.

FIG. 2 is a diagram depicting a functional construction of the synthesization unit 109. As shown in FIG. 2, the synthesization unit 109 includes a video change unit 109a for changing and outputting the image data that is outputted from the memory control units 7A to 7D based on the data effective signal outputted from the memory control units 7A to 7D, and also a multiplying unit 109b for synthesizing and outputting the video data outputted from the video change unit 109a and OSD data from the GUI generation unit 115.

The video change unit 109a monitors each data effective signal outputted from the memory control units 7A to 7D, and the video change unit 109a selects and outputs data which correspond to the data effective signal which has become active, from the respective image data outputted from the memory control units 7A to 7D. At this time, for the video change unit 109a the control unit 112 sets a priority for superimposing, determined based on the picture layout. As a result, in the case where there is a plurality of data effective signals which have become active, the video change unit 109a selects and outputs data having a higher priority from among the data corresponding to these data effective signals.

Therefore, the data of one screen (i.e., a synthesized screen) is provided to the subsequent multiplier 109b, since only the valid effective resolution areas of each of the four screens indicated in the four sets of screen image data outputted from the memory control units 7A to 7D are synthesized into one picture.

Further, the OSD data from the GUI generation unit 115 is provided to the multiplier 109b. Therefore, the multiplier 109b synthesizes the data from the video change unit 109a and GUI data from the GUI generation unit 115 and outputs the synthesized data.

According to FIG. 2, background data is created with the GUI; however, it is also possible to use the GUI to create an EPG picture or other pictures for assisting operations, for example, and synthesize those and each image data.

In order to display the screen image data from the synthesization unit 109 on the display unit 111, the control unit 110 performs display drive control and display format conversion in accordance with characteristics of the display unit 111. As an example, the display control unit 110 possesses an output timing generation function, and with this function it generates a horizontal synchronization signal of the output side and a vertical synchronization signal of the output side based on a reference clock, and provides these signals to the display unit 111 and also provides them to the synthesization unit 109, too, as timing control signals.

Based on the timing control signal from the display control unit 110, the display unit 111 performs a picture image display of the synthesized picture image data from the synthesization unit 109. The display unit 111 may be any type of display unit as long as it is an apparatus for performing a picture display of an image, such as a flat panel having a matrix electrode structure (i.e., such as a liquid crystal or plasma display, for example) or a CRT, etc. As one example thereof, this embodiment uses a large screen high-resolution display capable of displaying a high-vision picture image which is, ideally, 720 P or greater.

In addition to a CPU for performing calculation functions, the control unit 112 also comprises a counter and a register for measuring time, and a peripheral input/output interface, for example, and governs the general operation controls of the reception apparatus 100. Note, however, that the control unit 112 may be comprised of logic configuration only, or may also be a media processor capable of functioning as CPU or performing parallel processing. Further, the program for performing the controls may be built into the ROM 113, or may be sent from an external location through the peripheral input/output interface.

Operations of the Reception Apparatus 100

Next, explanation will be made of a specific process of receiving a television broadcast by the reception apparatus 100. The operations of the reception apparatus 100 explained hereinafter are performed by executing by the control unit 112 a predetermined processing program which is read out from the ROM 113 or other such source.

(1) Initialization Operations of the Reception Apparatus 100

Figure 3:
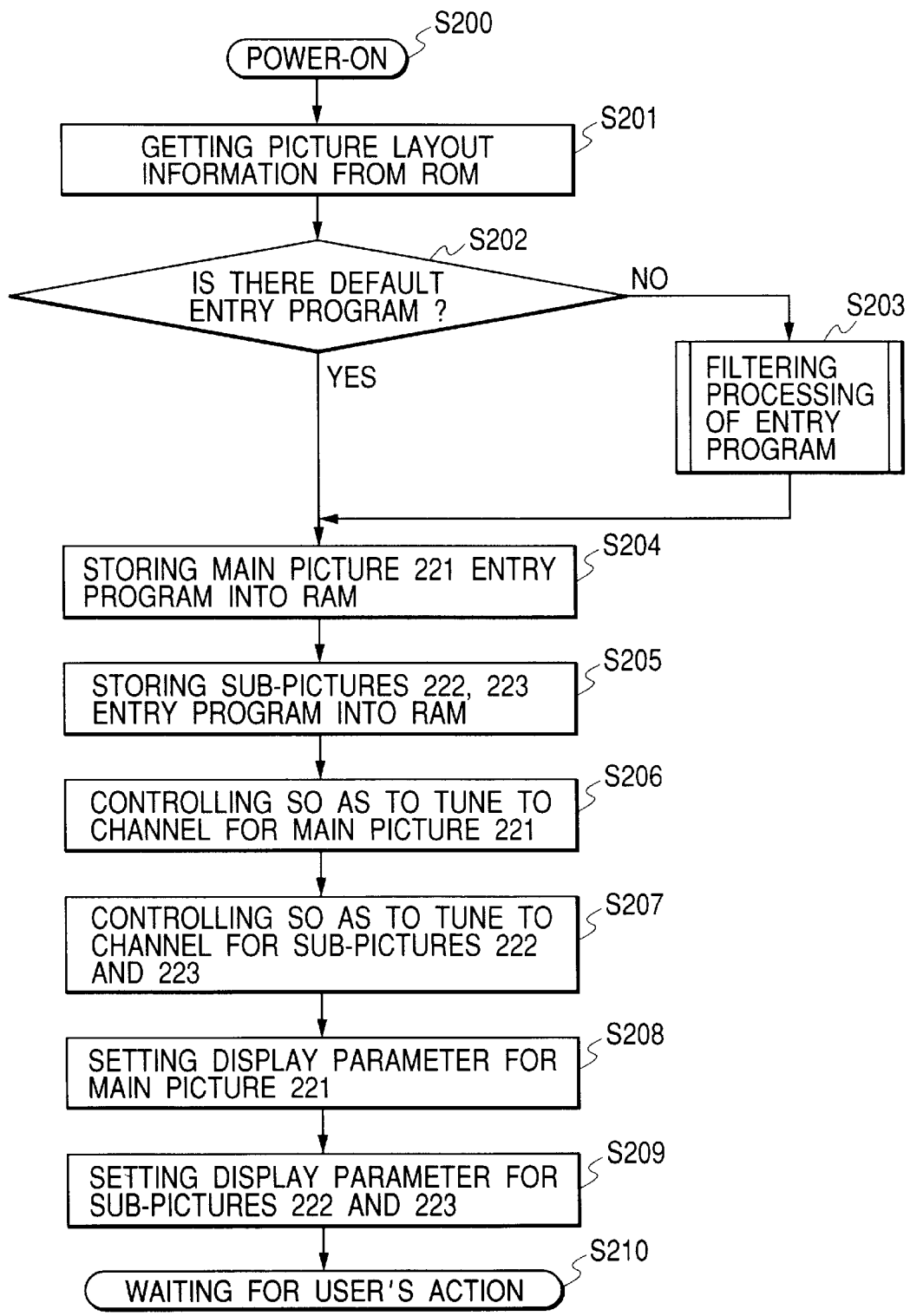
FIG. 3 is a flow chart for explaining an initialization operation of the reception apparatus according to the embodiment of the present invention.

FIG. 3 is a flow chart depicting initialization operations of the reception apparatus 100 at a time when a power source is supplied.

Figure 4:
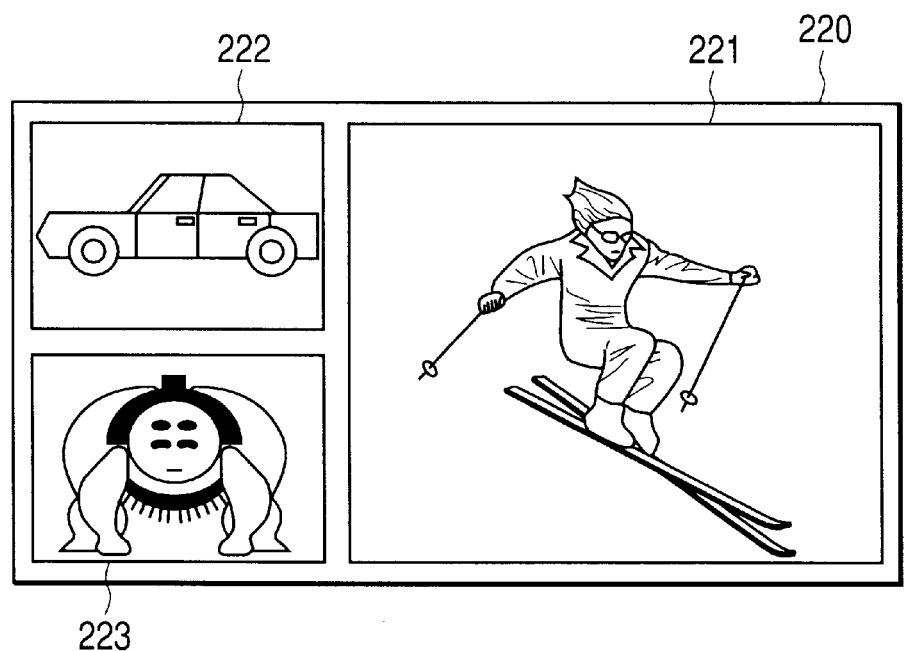
FIG. 4 is a diagram for explaining a picture layout.

First, when the control unit 112 detects instructions from the remote controller 117 to turn on the power source (step S200), it obtains picture layout information from the ROM 113 (step S201). As shown in FIG. 4, this picture layout information can be information for a picture layout 220 for simultaneously displaying one main picture 221 and a first and a second sub-picture 222, 223, for example. Because of a picture layout 220 such as this, the user can view a desired program on the main picture 221 while checking or searching other programs on the two sub-pictures 222, 223, for example. Note, that the picture layout 220 is not limited to the picture shown in FIG. 5.

Next, the control unit 112 distinguishes whether a program to be entered into the main picture 221 and programs to be entered into the sub-pictures 222, 223 in the picture layout 220 have been determined in advance or not (step S202). As a result of this distinguishing process, when the entry program has been decided, the next step S203 is skipped and the process proceeds directly to step S204 described below. In the case where the entry program has not been decided, the process advances to step S203.

As a result of the distinction made in step S202, when the entry program has not been decided for the main picture 221 and the sub-pictures 222, 223, the control unit 112 performs the filtering processing described below for filtering the entry programs and thus determines the programs to be entered into the main picture 221 and the sub-pictures 222, 223 (step S203). After that, the process advances to the next step S204.

At step S204 the control unit 112 stores the program to be entered into the main picture 221 in the RAM 114. Further, the control unit 112 stores the programs to be entered into the sub-pictures 222, 223 in the RAM 114 (step S205).

Figure 5:
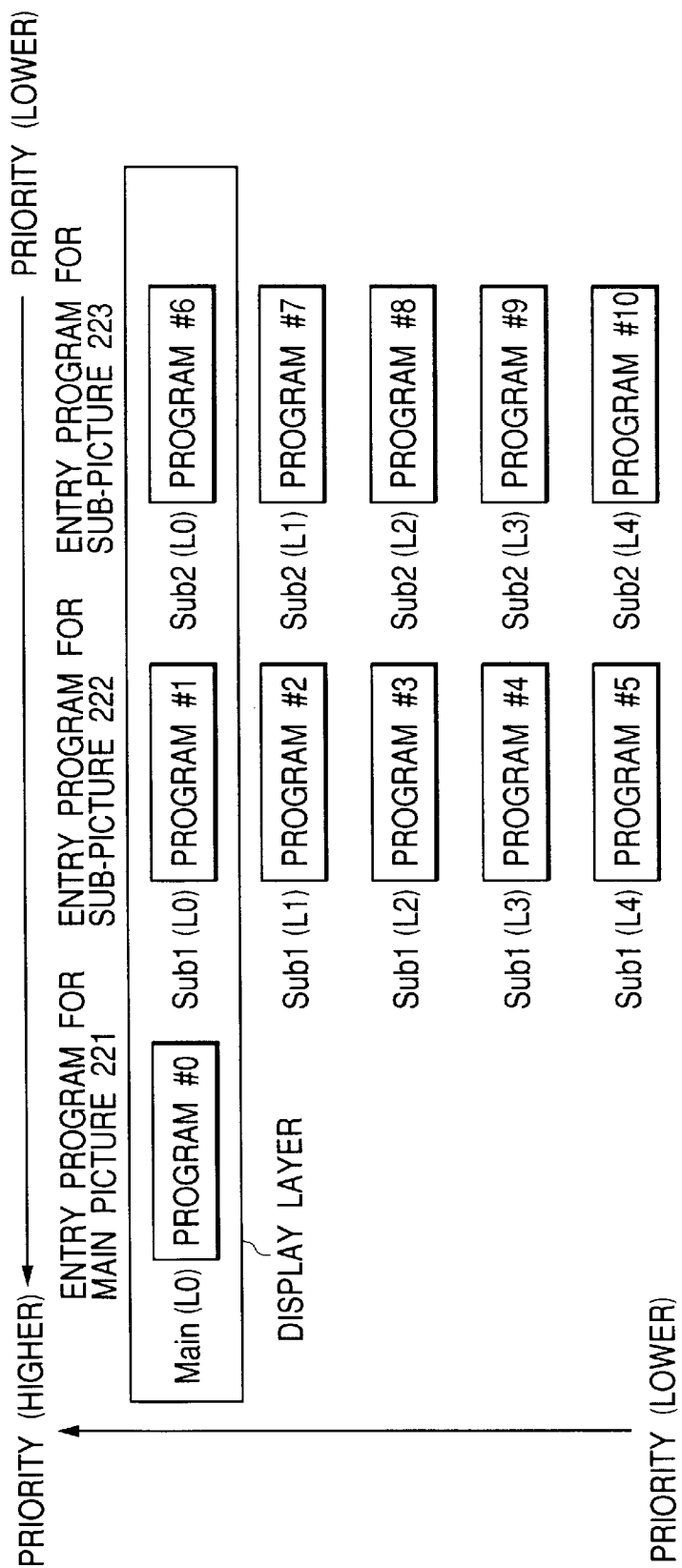
FIG. 5 is a diagram for explaining a configuration of an entry program.

FIG. 5 depicts one example of the stored content of the RAM 114 after the processing of step S204 and step S205 takes place. The RAM 114, as shown in FIG. 5 described above, comprises a region Main (L0) in which the entry program for the main picture 221 (i.e., program #0) is stored, regions Sub 1 (L0) to Sub 1(L4) in which the entry programs for the sub-picture 222 (i.e., program #1 to program #5) are stored, and regions Sub2 (L0) to Sub2 (L4) in which the entry programs for the sub-picture 223 (i.e., program #6 to program #10) are stored.

In this embodiment there is one program as the entry program for the main picture 221 and five programs as the entry programs for each of the sub-pictures 222, 223. The reason why the entry programs for the sub-pictures 222, 223 are made to be more than one is to register in advance programs which can be changed by a wipe process within the sub-pictures 222, 223 as described below based on an action from the user. Further, particularly in the case of multi-channel digital broadcasting, it is preferable to limit the number of the entry programs of the sub-pictures 222, 223 as in this embodiment in order to alleviate the burden on the user of selecting at a time channels.

According to the picture layout 220 in FIG. 4, the priority level of the entry programs stored in the RAM 114 (i.e., the level of priority for the user) as appearing in the display screen (hereinafter, referred to as the "multi-picture") is: "main picture 221>sub-picture 222>sub-picture 223"; and the priority of the entry programs for the sub-picture 222 is "Sub1 (L0)>Sub1 (L1)>Sub1 (L2)>Sub1 (L3)>Sub1 (L4)"; and the priority for the entry programs in the sub-picture 223 is "Sub2 (L0)>Sub2 (L1)>Sub2 (L2)>Sub2 (L3)>Sub2 (L4)".

Further, at the time of viewing the multi-picture display, the entry programs Main (L0), Sub1 (L0) and Sub2 (L0) stored in the RAM 114 become a display layer of programs displayed on the display unit 111, and the remaining entry programs for sub-pictures 222, 223 are a non-displayed layer waiting in the RAM 114 as ready-cue programs.

After the entry programs of the main picture 221 and the sub-pictures 222, 223 are stored in the RAM 114, the control unit 112 performs control of the selection of the channel for the main picture 221 (step S206). This channel selection means an overall sequence control operation as follows.

First, the control unit 112 obtains the information of the program #0 stored in the region Main (L0) of the RAM 112, and controls the tuner unit 2A based on this information. From a television signal outputted from the antenna 101 the tuner unit 2A selects a transponder including a channel containing the program #0. Next, the control unit 112 controls the demultiplexer 4A and separates the MPEG 2 TS of the channel which was supplied from the tuner 2A through the demodulation unit 3A, and which contains the program #0. Then, the control unit 112 controls the video decoder 51, and decodes the image data of the MPEG 2 from the demultiplexer 4A which is from the channel containing the program #0.

In this way, after the program for the main picture 221 of step S206 is received, the control unit 112 receives the programs for the sub-pictures 222, 223 in the same way as the channel control for the main picture 221 (step S207).

At this point, the control unit 112 has performed control of each of the constitutive parts of the video processing unit 102A by virtue of the channel selection control for the main picture 221; however, for the channel selection processing for the sub-pictures 222, 223, the control unit 112 performs control of the constitutive parts of the video processing unit 102B for the channel selection for sub-picture 222, and performs control of the constitutive parts of the video processing unit 102C for the channel selection of the sub-picture 223.

Next, the control unit 112 performs setting of the display parameters for the main picture 221 (step S208). For example, based on information of the layout 220 obtained at step S101, the control unit 112 configures resolution conversion parameters for the enlargement/reduction unit 6A for the main picture 221 (i.e., the enlargement/reduction ratio, the enlargement/reduction weighting, the filter coefficient, etc.), and also configures memory control parameters for the memory control unit 7A (i.e., the write region (address) in the memory 8A for writing the image data from the enlargement/reduction unit 6A, and the read region (address) for reading out the image data from the memory 8A, etc.).

Next, in the same way that the display parameters were configured for the main picture 221, the control unit 112 performs setting of the display parameters for the sub-pictures 222, 223 (step S209). Note that the control unit 112 performs the setting of the parameters for each of the constitutive parts of the video processing unit 102A by virtue of configuring the display parameters for the main picture 221; however, in order to configure the display parameters for the sub-picture 222, the control unit 112 performs setting of the parameters for each of the constitutive parts of the video processing unit 102B, and in order to configure the display parameters for the sub-picture 223, the control unit 112 performs setting of the parameters for each of the constitutive parts of the video processing unit 102C.

As a result of the processes described above, the entry program is stored in its initialized state in the RAM 114 as shown in FIG. 5, and a multi-picture based on the picture layout 220 as shown in FIG. 4 is displayed in the display unit 111. Then the procedure enters a waiting state of waiting for a user action from remote controller 117 (step S210).

(2) Filtering Processing of the Entry Program

Figure 6:
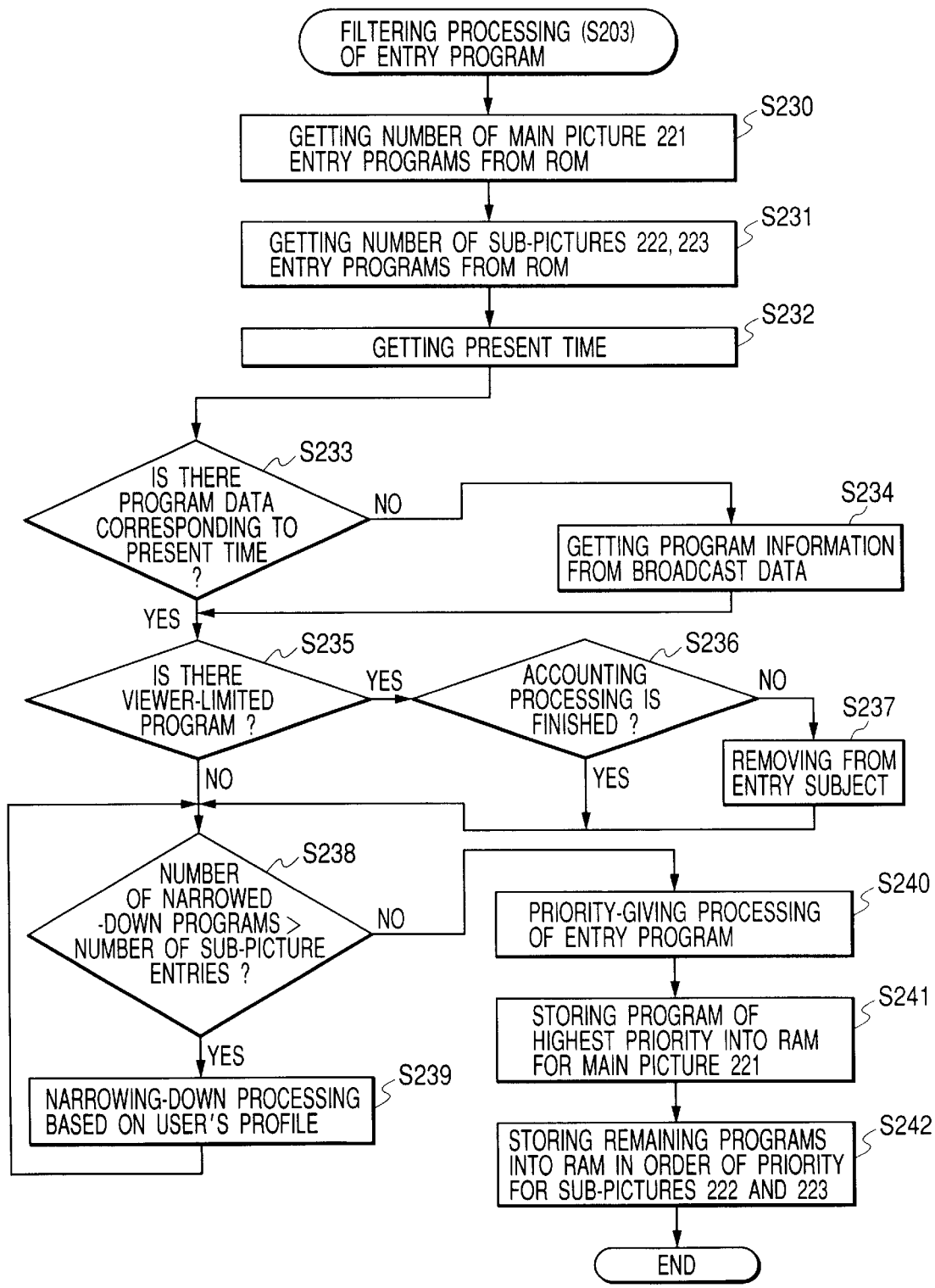
FIG. 6 is a flow chart for explaining a filtering processing of the entry program in the initialization operations.

FIG. 6 is a flow chart depicting filtering processing of the entry program by the control unit 112 at step S203 in FIG. 3.

First, the information of the number of the entry programs stored in advance in the ROM 113 for the main picture 221 is obtained (step S230). According to this embodiment the number of the entry programs for the main picture 221 is set at "1".

Next, the information of the number of the entry programs stored in advance in the ROM 113 for the sub-pictures 222, 223 is obtained (step S231). According to this embodiment the number of the entry programs for the sub-pictures 222, 223 is set at "5".

Next, the control unit 112 gets information regarding the present time (step S232). For example, the control unit 112 obtains the accurate present time from a time stamp in the TS data of the broadcast. Alternatively, the control unit 112 gets information of the present time from a built-in time counter which keeps track of the date and time.

Next, a determination is made as to whether there is program data corresponding to the present time obtained at step S232 (step S233). As a result of this determination, in the case where there is program data, the process skips the next step S234 and advances immediately to step S235 described below, but in the case where there is not a program, the process advances to the next step S234.

As a result of the determination made at step S233, in the case where there is not program data corresponding to the present time, the control unit 112 gets the data of a program which can be viewed at the present time from the broadcast data (step S234). In the case where this program data is a BS digital broadcast, it is possible to obtain the program data from an EPG service for all the channels, which is sent with being attached to each transponders, and in the case where the program data is a CS digital broadcast, the program data can be obtained from a promotion channel. After this, the process then advances to step S235.

At step S235, a determination is made as to whether there is a viewer-limited program in the program data or not. As a result of this determination, in the case where there is a viewer-limited program, the process then advances to step S236, and in the case where there is not a viewer-limited program, the process advances immediately to step S238 described below.

As a result of the determination made at step S235, in the case where there was a viewer-limited program, a determination is then made as to whether charging processing for the viewing of the program is finished or not (step S236). For example, the control unit 112 may obtain information about the status of the charging processing from an IC card (not shown) or the like, on which there is written various information for limited signal reception, and then perform the above determination. As a result of this determination, in the case where the charging processing has been finished, the procedure then advances immediately to step S238 described below, but in the case where the charging processing has not been finished, the procedure advances to the next step S237.

As a result of the determination made at step S236, in the case where charging processing has not been finished, processing is performed in order to remove this program from entry programs (step S237). After that, the process advances to the next step, S238.

At step S238, the control unit 112 makes a determination as to whether the number of programs narrowed down by the processes of steps S233 and S237 is greater than the maximum number of entry programs obtained at steps S230 to S231 (i.e., according to this embodiment, the number of programs for the main picture 221+the number of programs for the sub-picture 222+the number of programs for the sub-picture 223=1+5+5=11 programs). As a result of this determination, in the case where "number of narrowed-down programs>maximum number of entry programs" is true, then the process advances to step S239, and in the case where "number of narrowed-down programs>maximum number of entry programs" is not true, then the process advances to step S240.

As a result of the determination made at step S238, in the case where "number of narrowed-down programs>maximum number of entry programs" is true, the control unit 112 performs processing to narrow down the number of programs so that it falls within the maximum number of entry programs, based on a user profile which contains information such as the user's viewing history, or the user's preference information (i.e., categories, actors and actresses) configured by the user in advance with the remote controller 117 or another manipulation means (not shown), for example (step S239). After that, the process returns to step S238 again, and repeats the subsequent steps.

On the other hand, in the case where the result of the determination made at step S238 is that "number of narrowed-down programs>greatest number of entry programs" is not true, the user's profile is used for a process of giving priority to the entry programs (step S240). Note that it is possible to use well known methods for the process of narrowing down in step S239 and the process of giving priority codes in step S240, both of which processings are based on the user's profile.

Then, the control unit 112 stores the program with the highest priority into the RAM 114 as the program for the main picture 221 (step S241), and stores the remaining programs as programs for the sub-pictures 222, 223 in the RAM 114 according to their respective priorities (step S242). As for the specific method of configuring the programs for the sub-pictures 222, 223, the entry order (i.e., the set order) based on the priority and the programs already being displayed have high priority, so it is desirable to set the programs so that the order of their priorities is: "Sub1 (L0)>Sub2 (L0)>Sub1 (L1)>Sub2 (L1)>Sub1 (L2)>Sub2 (L2)>Sub1 (L3)>Sub2 (L3)>Sub1 (L4)>Sub2 (L4)", as in FIG. 5.

(3) Sub-Picture Program Changing Operation by Wipe Process using Two Tuners

In the state where a plurality of received channels are displayed as described above in the multi-picture according to the picture layout 220 depicted in FIG. 4, it is possible to use the remote controller 117 to select one of the two sub-pictures 222, 223 and change the channel being displayed on that sub-picture. In this case, when the program is changed instantaneously it is difficult for the user to tell which screen has changed. In order to resolve this, in the present embodiment a unique wipe transition effect is used, so it is easy to recognize which screen has changed. Explanation will be made of a program changing process of this embodiment, making reference to FIG. 7 and FIG. 8.

Here, the processing system for the main picture 221 is the video processing unit 102A; the processing system for the sub-picture 222 is the video processing unit 102B; the processing system for the sub-picture 223 is the video processing unit 102C; and the video processing unit 102D is a processing system for common use at a time when the channels of both the sub-pictures 222 and 223 are changed. The synthesization unit 109 is a unit having the ability to process the image data from those four independent processing systems simultaneously.

Figure 7:
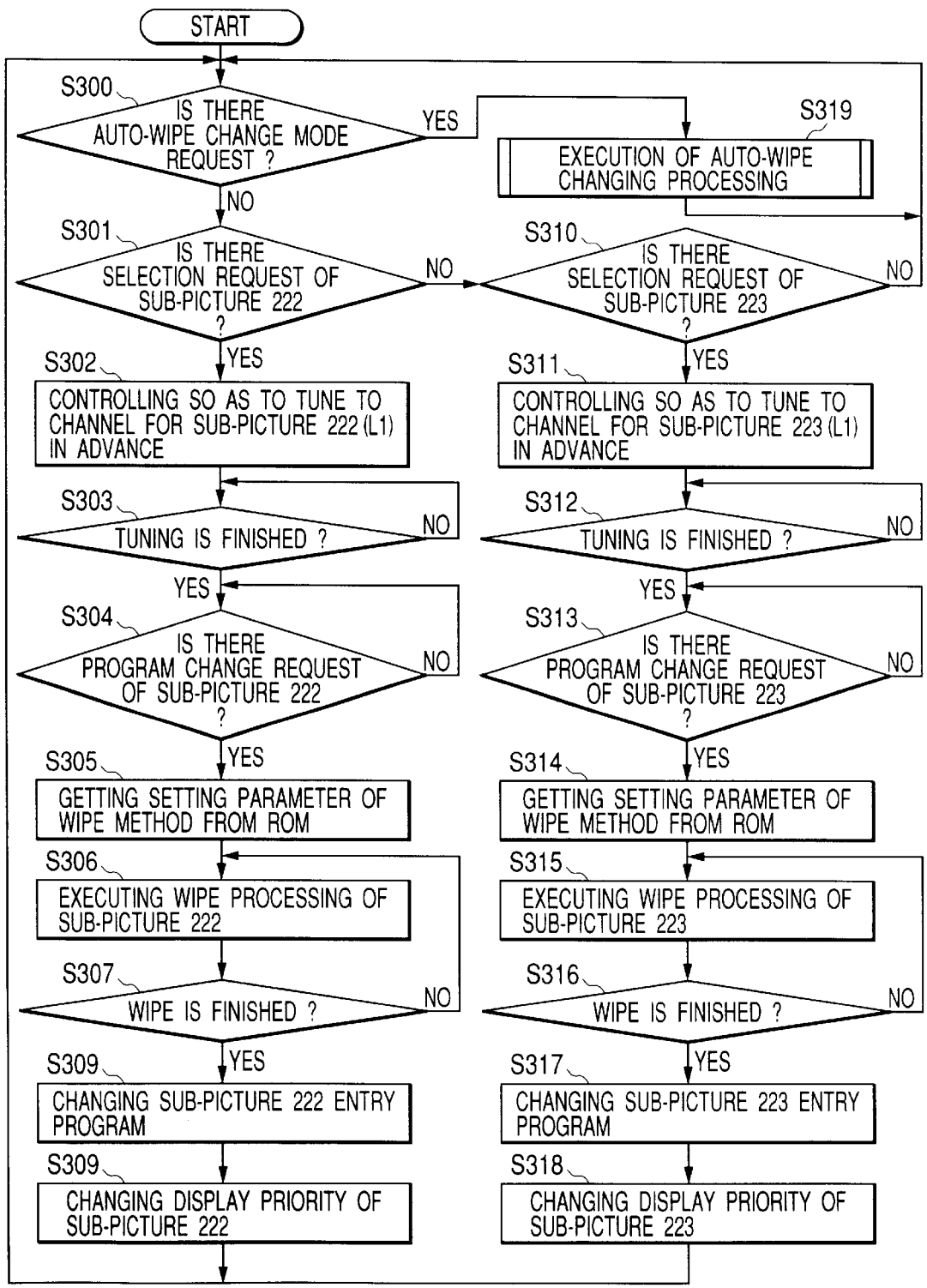
FIG. 7 is a flow chart for explaining a sub-picture wipe change processing using a double tuner.

FIG. 7 is a flow chart for explaining processing performed by the control unit 112 when the channel of a sub-picture is changed. In the flow chart of FIG. 7, the points S300, S301, S304, S310 and S313 where the flow of the procedure splits off based on various conditions indicate splits based on user actions from the remote controller 117.

First, the control unit 112 distinguishes whether the command received at the remote control photo-receiving unit 116 is a command which was given by the user depressing an auto wipe change mode key provided to the remote controller 117 or not (i.e., whether it is a command for the auto wipe change mode or not) (step S300). Here, the auto wipe change mode refers to a mode at a time when the user is viewing a television program on the multi-picture depicted in FIG. 4, and during this time the reception apparatus 100 automatically changes the channel being displayed on the sub-pictures 222, 223 for a desired period of time while performing the wipe process. As a result thereof, the user can check various programs without manipulating the remote controller 117.

As a result of the determination made at step S300, in the case where the command is for the auto wipe change mode, the control unit 112 executes the automatic wipe change process (step S319), then returns to step S300, and then repeats the subsequent processing steps. Note that the automatic wipe change process is described below.

As a result of the determination made at step S300, in the case where the command is not for the auto wipe change mode, it is recognized as a user action mode and a determination is made as to whether a command from the remote controller 117, indicating a selection of the sub-picture 222 is received through the remote control photo-receiving unit 116 or not (i.e., whether a sub-picture 222 selection request is received or not) (step S301). As a result of this determination, in the case where a sub-picture 222 selection request has not been received, determination is then made as to whether a command from the remote controller 117, indicating a selection of the sub-picture 223 has been received or not (i.e., whether a sub-picture 223 selection request was received or not) (step S310).

As a result of the determinations made at step S301 and step S310, in the case where neither a selection request for the sub-picture 222 nor the sub-picture 223 was received at the remote control photo-receiving unit 116, the process returns to step S300 and repeats the subsequent processing steps. Further, as a result of the determination made at step S301, in the case where the selection request for the sub-picture 222 was received at the remote control photo-receiving unit 116, the process then advances to the processing which begins at step S302; and in the case where the selection request for the sub-picture 223 was received at the remote control photo-receiving unit 116, the process then advances to the processing which begins at step S311.

Next, explanation will now be made of the processing of step S302 and thereafter; however, the processing of steps S302 to 309 and the processing of steps S311 to 318 are only different from each other with respect to the sub-picture which is subject to the processing, and their basic processes are similar to each other; therefore, explanation will only be made of steps S302 to 309.

Here, explanation will now be made of the correspondence between FIG. 1 and FIG. 8.

Figure 8:
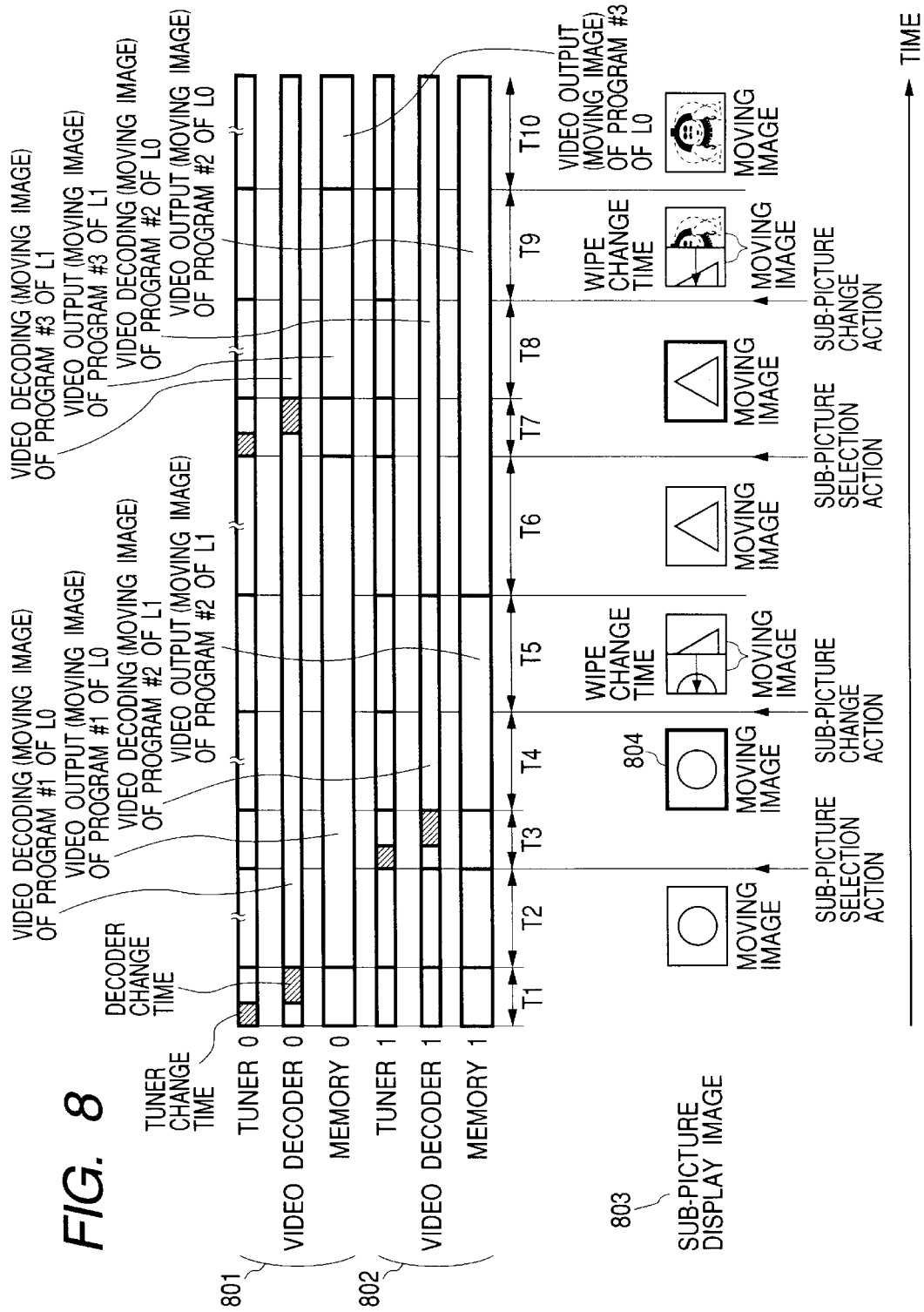
FIG. 8 is a diagram for explaining timing in the sub-picture wipe change processing using the double tuner.

FIG. 8 is a timing flow chart depicting the processing of the video processing unit 102 that takes place when the channel of either the sub-picture 222 or sub-picture 223 is changed. FIG. 8 shows the processing performed by the video processing unit 102 on the data of the channel displayed in either sub-picture 222 or 223. As an example, what is shown here is the processing of the video processing unit 102B, which is the processing system for the sub-picture 222. Further, 802 indicates the processing of the video processing unit 102D, which is the common processing system used at a time when the channels of both the sub-picture 222 and 223 are changed.

Therefore, "tuner 0" denoted by a reference numeral 801 corresponds to the tuner unit 2B, "video decoder 0" denoted by 801 corresponds to the video decoder 5B and "memory 0" denoted by 801 corresponds to the memory 8B. Also, "tuner 1" corresponds to the tuner unit 2D, "video decoder 1" corresponds to the video decoder 5D and "memory 1" corresponds to the memory 8D. Further, 803 depicts the display of the sub-picture 222 or 223 in FIG. 4.

In the initialization processing described above, a duration of time T1 is the sum of the channel changing time, which occurs with the process of tuning the tuner 0 (i.e., the tuner 2B) when the power is turned on, plus a duration of time until start of the decoding, which takes place when the channel of the video decoder 0 (i.e., the video decoder 5B) is changed. In this initialization processing, after this time T1 elapses, the video decoder 0 (i.e., the video decoder 5B) outputs the video (moving image) data of the program #1 which is stored in the region Sub1 (L0) of the RAM 114.

Then, the memory control unit 7B writes the video data outputted from the video decoder 0 (i.e., the video decoder 5B) into the memory 0 (i.e., the memory 8B), and outputs it to the synthesization unit 109.

Then, after a duration of time T2 elapses, in the case where there is selection request for the sub-picture 222 at step S301, the control unit 112 performs control of the video processing unit 102D, which is the common processing system for the sub-pictures 222, 223, such that the video processing unit 102D selects in advance the channel of the program #2 stored in the region Sub1 (L1) for the sub-picture 222 (step S302).

The video processing unit 102D follows the instructions from the control unit 112, and starts receiving the channel containing the program #2. After a duration of time T3 elapses, which is the sum of the change time of the tuner 1 (i.e., tuner unit 2D) plus the change time of the video decoder 1 (i.e., video decoder 5D), the video decoder 1 (i.e., video decoder 5D) then outputs the video (moving image) data of the program #2.

Then, the video data of the program #2 is written into the memory 1 (i.e., memory 8D) by the memory control unit 7D, and is outputted to the synthesization unit 109 together with the video data read out from the memory 0 (i.e., memory 8B); however, the priority relationship is: "the output image from the memory 0 (i.e., the memory 8B)>the output image from the memory 1 (i.e., the memory 8D)". Therefore, the video data stored in the memory 8D is not displayed on the display unit 111.

Further, when the sub-picture 222 is selected by the user, the control unit 112 controls the GUI generation unit 115 and outputs to the synthesization unit 109 the data of frame 804 indicating, as shown in 803, that the sub-picture 222 is selected, and then the synthesization unit 109 synthesizes this frame 804 and the sub-picture 222 and displays the synthesization result.

The reason why the data of a channel to be a change candidate for the sub-picture 222 is to be received in advance at step S302 is that in the case of digital broadcasting it is necessary to decode the received data and this processing requires 2 to 3 seconds, compared with analog broadcasting in which the channel change is merely a change in the channel being received by the tuner and it is therefore possible to perform the channel change virtually instantaneously in approximately 500 milliseconds.

Further, according to the present embodiment, the candidate program particularly for the time when the channels of the sub-pictures 222, 223 are changed are entered into the RAM 114 in advance, and this determines the programs to be displayed after the channel change instructions are given; therefore, when the sub-picture is selected, channel pre-turning can be performed quickly.

The control unit 112 waits until the channel pre-tuning at step S302 is completed (step S303), and when the control unit 112 recognizes that the channel pre-tuning has completed, the control unit 112 waits until a command from the remote controller 117, for changing the program of the sub-picture 222 (i.e., a sub-picture 222 program change request) is received from the remote controller 117 at the remote control photo-receiving unit 116 (step S304). Then when the control unit 112 confirms that the program change request command has been received, the control unit 112 gets the setting parameters for the wipe method, which are stored in advance in the ROM 113 (step S305), and executes the wipe processing of the sub-picture 222 (step S306).

Then, when the control unit 112 recognizes that the wipe processing has completed after a time T5 has elapsed as shown in FIG. 8 (step S307), the control unit 112 changes the priority of the sub-picture 222 entry programs stored in the RAM 114 in a rotational manner such that changing order is:
Sub1 (L0)←Program #2
Sub1 (L1)←Program #3
Sub1 (L2)←Program #4
Sub1 (L3)←Program #5
Sub1 (L4)←Program #1 (step S308)

Further, the control unit 112 also changes the display priority of the sub-picture 222 to: "the output image from the memory 1 (i.e., the memory 8D)>the output image from the memory 0 (i.e., the memory 8B)" (Step S309).

Subsequently, the procedure then returns to step S300 again, and in the case where there is selection request for a sub-picture 222 after a duration of time T6 in FIG. 8 has elapsed, the processing from the steps S301 to S309 is repeated. Note that at this time the video data obtained from the video processing unit 102D is being displayed on the sub-picture 222; therefore, the data of the program #3 is received in advance from the video processing unit 102B, and then in the case where there is a program change command, a change is made from the video data outputted from the video processing unit 102D to the video data outputted from the video processing unit 102B.

Here, explanation will now be made of the wipe change processing of step S306 in FIG. 7, making use of an example.

According to the present embodiment, at the synthesization unit 109 the data effective signals from the memory control units 7B, 7D are monitored, only the video data of data effective signals which are active are outputted, and in the case where more than one data effective signal became active simultaneously, the video image synthesis is realized by selecting the video data based on its priority; however, in the wipe change processing the video image synthesis is also realized in the same way.

Figure 9:
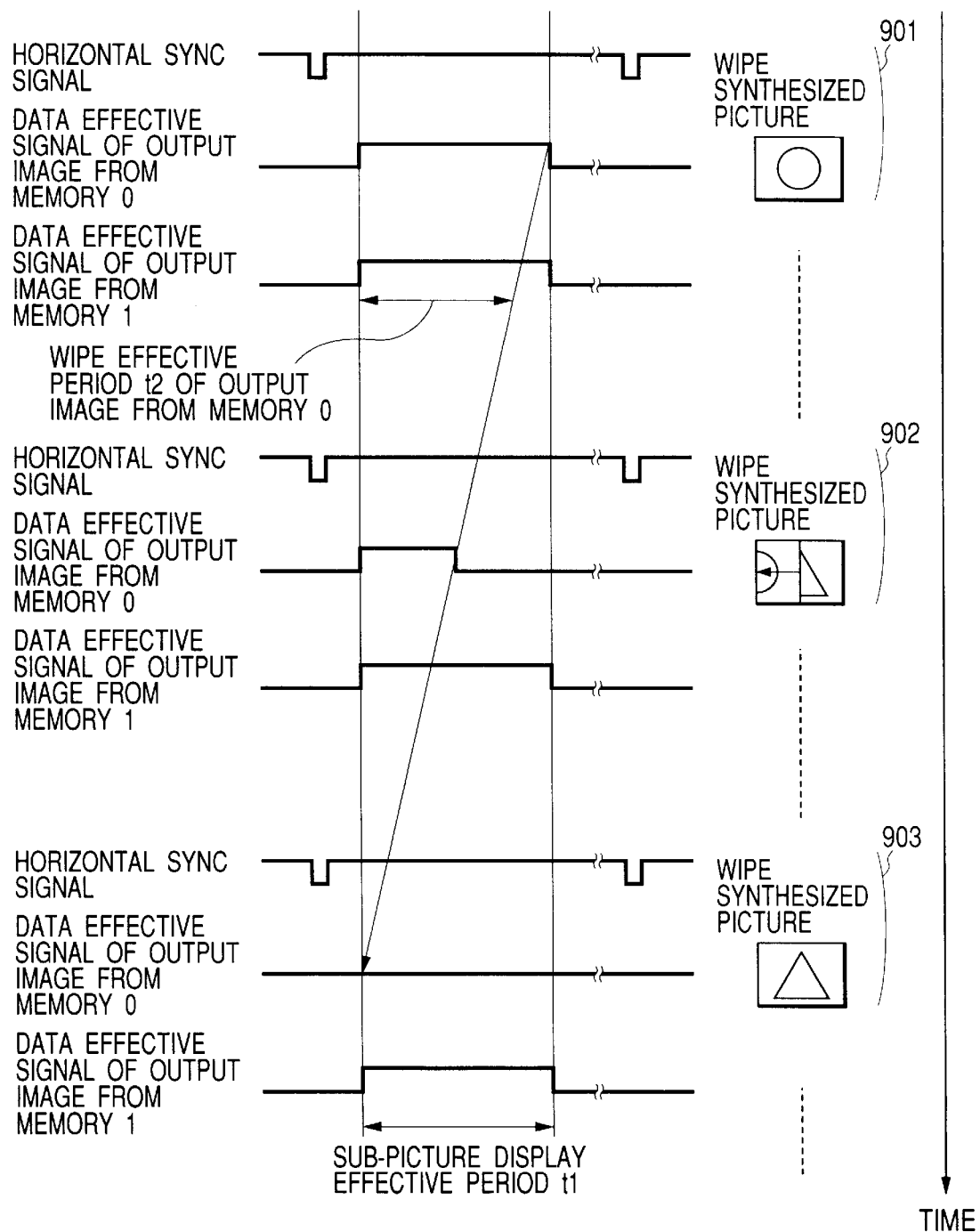
FIG. 9 is a diagram for explaining a wipe synthesized picture in the sub-picture wipe change processing using the double tuner.

FIG. 9 is a timing flow chart for explaining the wipe change processing performed by the synthesization unit 109. In FIG. 9, 901 denotes the horizontal processing timing immediately before the wipe change processing is started. As shown in 901, the data effective signals of the images outputted from the memory 0 (i.e., the memory 8B) and the memory 1 (i.e., the memory 8D) are both outputted together from the memory control units 7B and 7D for the duration of a sub-picture display effective period t1 shown in FIG. 1. Therefore, because of the priority relationship (i.e., "the output image from the memory 0>the output image from the memory 1"), the result of the synthesization of the wipe picture will be the image outputted from the memory 0 (i.e., memory 8B) only.

Further, in FIG. 9, 902 denotes the horizontal processing timing during the wipe change processing. As shown in 902, the data effective signal of the output image from the memory 0 (i.e., memory 8B) is outputted with a wipe display effective region (i.e., a wipe effective period t2 of the output image from the memory 0) being partially masked by the memory control unit 7D. Therefore, the result of the synthesization of the wipe picture will be a partially synthesized picture of the output images from the memory 0 (i.e., memory 8B) and the memory 1 (i.e., memory 8D).

Further, in FIG. 9, 903 denotes the horizontal processing timing immediately after the wipe change processing. As depicted in 903, the data effective signal of the output image from the memory 0 (i.e., memory 8B) is completely masked at the memory control unit 7B to be output. Therefore, the result of the synthesization of the wipe picture will be only the image outputted from the memory 1 (i.e., memory 8D).

Explanation will now be made of one example of a method of controlling the output image form the memory 0 (i.e., memory 8B) shown in 902 in FIG. 9.

Presuming that the units for the control of the mask region are: T[s] for the wipe effect time; F[Hz] for the refresh rate of the display unit 111; and H[Pixel] for the horizontal resolution of the wipe subject sub-picture (i.e., sub-picture 222 (1) in the present example), then calculations are made as follows:

$$\text{number of wipe steps} = T \times F \quad \text{(equation 1);}$$

and then from equation 1:

$$\text{of unit (Pixel) the mask area control} = H/\text{number of wipe steps} \quad \text{(equation 2);}$$

and then from equation 2 the sub-picture effective period during the wipe is:

$$\text{sub-picture effective period during the wipe} = \text{sub-picture effective period} - \text{unit of mask region control} \quad \text{(equation 3).}$$

Controls based on equations 1 to 3 are synchronized to a vertical synchronization signal of the display unit 111 to be executed the number of times indicated in equation 1 as the number of wipe steps, thereby realizing wipe processing within the fixed period of time.

Further, by using the controls of the memory control unit 7B to set the image region which is to be outputted during the sub-picture effective period during the wipe shown in equation 3, it thus becomes possible to achieve a variety of wipe visual effects. For example, if the output region of the image outputted from the memory 0 (memory 8B) is reduced from the left by the mask region control unit shown in equation 2 and the data effective signal is outputted according to the timing shown in FIG. 9, then a wipe display effect can be achieved such that the output image from the memory 0 (memory 8B) is pulled out from the left as a moving picture as in the wipe synthesize picture image shown in FIG. 9, and the output image from the memory 1 (memory 8D) will appear in gradual steps as a moving image.

By executing the processes described above, it is possible to realize channel selection by a sub-picture wipe change when the multi-picture is being displayed.

Next, explanation will now be made of the auto wipe change process at step S319 of FIG. 7.

The auto wipe change process is a process of the reception apparatus 100, in which the programs shown on the sub-pictures 222, 223 are changed at a desired performing interval while performing the wipe processing, when the user is viewing a television broadcast on the display screen (i.e., the multi-picture) according to the picture layout 220 of FIG. 4. This process enables the user to check programs other than the program being displayed on the main picture 221, without giving instructions for selection of the sub-pictures or for program changes by the remote controller 117.

Figure 12:
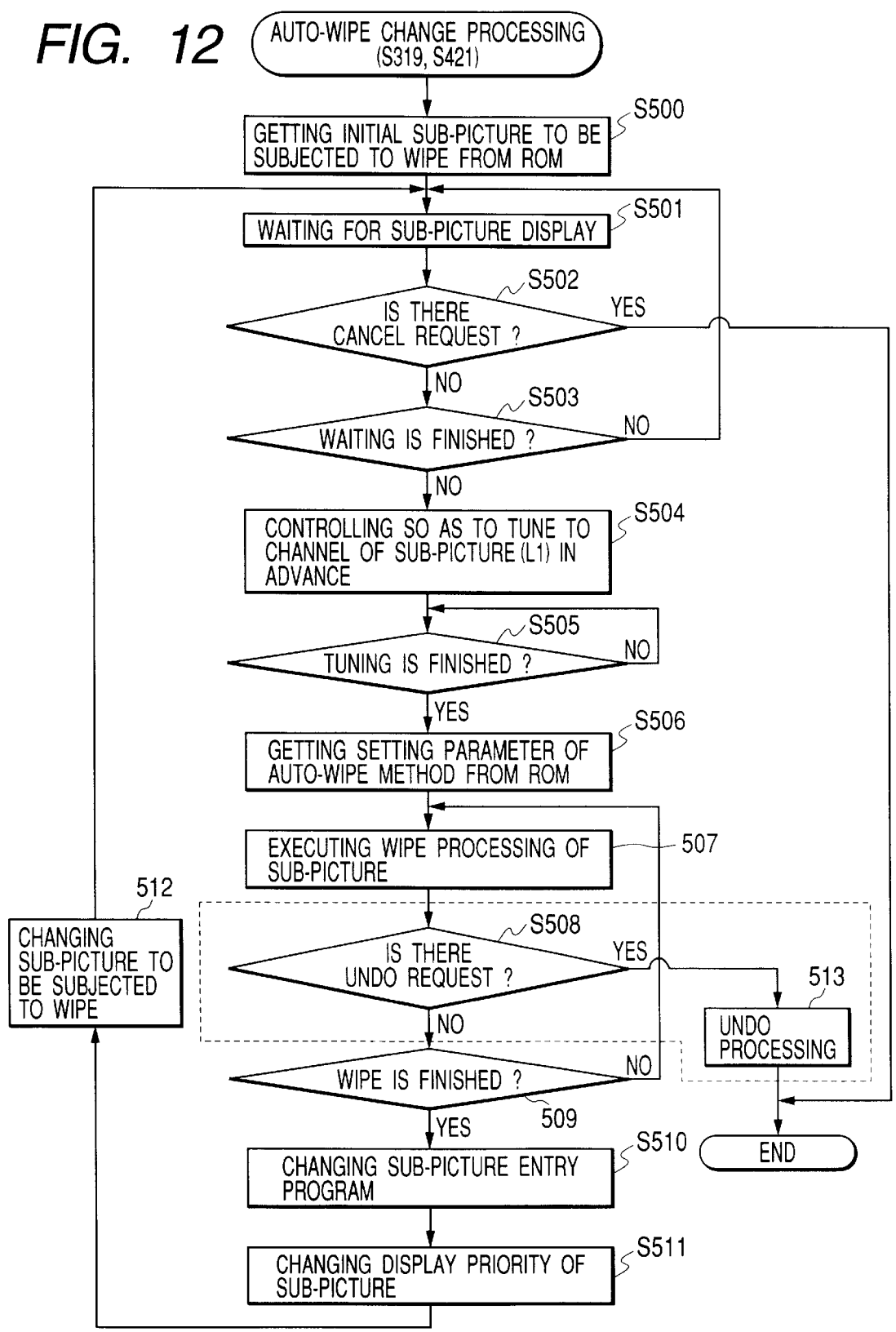
FIG. 12 is a flow chart for explaining an automatic wipe change processing in the sub-picture-wipe change processing using the double tuner.

FIG. 12 is a flow chart depicting the auto wipe change process performed by the control unit 112. In the flow chart in FIG. 12, the splits in the procedural flow at step S502 and step S508 based on conditions are based on user actions made from the remote controller 117.

First, the control unit 112 obtains information of the sub-picture which is to be subjected to of the wipe change as preset in the ROM 113 (step S500). Here, it is assumed that the sub-picture to be the subject to the wipe change is the sub-picture 222 with the higher display priority.

Next, the control unit 112 controls the display unit 111 via the display control unit 110, and thereby effects a display wait so as to display the sub-picture 222 on the display unit 111 for a given duration of time. During this period the user can thoroughly view the sub-picture 222.

Next, the control unit 112 makes a determination as to whether a cancel command is received at the remote control photo-receiving unit 116 from the remote controller 117 or not (i.e., whether there was a cancel action from the user or not) (step S502). As a result of this determination, in the case where there is a cancel action, this processing ends immediately. That is, the process escapes from the auto wipe change mode.

On the other hand, as a result of the determination made at step S502, in the case where there is not a cancel action, when the control unit 112 detects that the display wait for the given period of time has been completed (step S503), the control unit 112 controls the processing systems of the sub-pictures 222, 223, namely the video processing unit 102D so as to select and receive in advance the channel containing the program 2 stored in the region Sub1 (L1) of the RAM 114 which is for the sub-picture 222 (step S504).

When the control unit 112 recognizes the completion of the channel selection at step S504 (step S505), then it obtains the setting parameters of the auto wipe method recorded in advance in the ROM 113 (step S506), and executes the wipe change processing on the sub-picture 222 using these setting parameters (step S507). The processing timing thereof is the same as the timing shown in FIG. 8.

Here, what is important in this auto wipe change process is the wipe effect time. For example, in the case where the user wants to change the program being displayed in the sub-picture quickly, it is advantageous to focus on changing the program with a user action as explained in connection with FIG. 7, and therefore configure the wipe effect time so that it is rather short.

However, in the auto wipe change process, the most essential point when the user is viewing the main picture 221 is to have the reception apparatus 100 automatically change the sub-picture throughout a desired period so that the viewer can check programs without using the remote controller 117; therefore, setting the wipe effect time on the long side is advantageous because this enables the user to see the screen more easily.

For example, in the case where the user wishes to set the wipe effect time about four seconds so as to perform the wipe to at a leisurely pace, if a display period of the display unit 111 is 60 [Hz], then, according to the equation 1 described above, the number of wipe steps can be set at: number of wipe steps=4[s]×60[Hz]=240 steps to realize the above wipe operation.

In this way, in the present embodiment, the wipe effect time in the auto wipe change process is set longer than the wipe effect time which is used when the program on the sub-picture is changed by the user action, as shown in FIG. 7. This wipe effect time may be set freely by the user by manipulation of the remote controller.

Next, when the control unit 112 detects the completion of the wipe change process at step S507 (step S509), then it changes the order of the sub-picture 222 entry programs in the RAM 114 in a rotational fashion to:
Sub1 (L0)←Program #2
Sub1 (L1)←Program #3
Sub1 (L2)←Program #4
Sub1 (L3)←Program #5
Sub1 (L4)←Program #1 (step S510)

Further, the control unit 112 also changes the display priority of the sub-picture 222 to: "the output image from the memory 1>the output image from the memory 0" (step S511), and changes the sub-picture which is to be subjected to the wipe from the sub-picture 222 to the sub-picture 223 (step S512). After that, the control unit 112 returns once again to step S501 and executes the subsequent processing on the sub-picture 223.

The execution of the processing steps explained above produces an effect that the sub-picture 222 and the sub-picture 223 are changed alternately with the auto wipe operation, and at the same time, it is possible to automatically check the entry programs of the sub-pictures in the following sequence: sub-picture 222 (program #1)→sub-picture 223 (program #6)→sub-picture 222 (program #2)→sub-picture 223 (program #7)→sub-picture 222 (program #3)→sub-picture 223 (program #8) . . . . Further, the wipe effect time of the auto wipe change process is made to be different from the wipe effect time at a user action, and this enables to provide a user interface which is easy to use. This is a unique technological advantage of this embodiment.

Next, explanation will be made regarding step S508 in FIG. 12 where there is an UNDO action of the user during the switching of the program on the sub-pictures.

Figure 13:
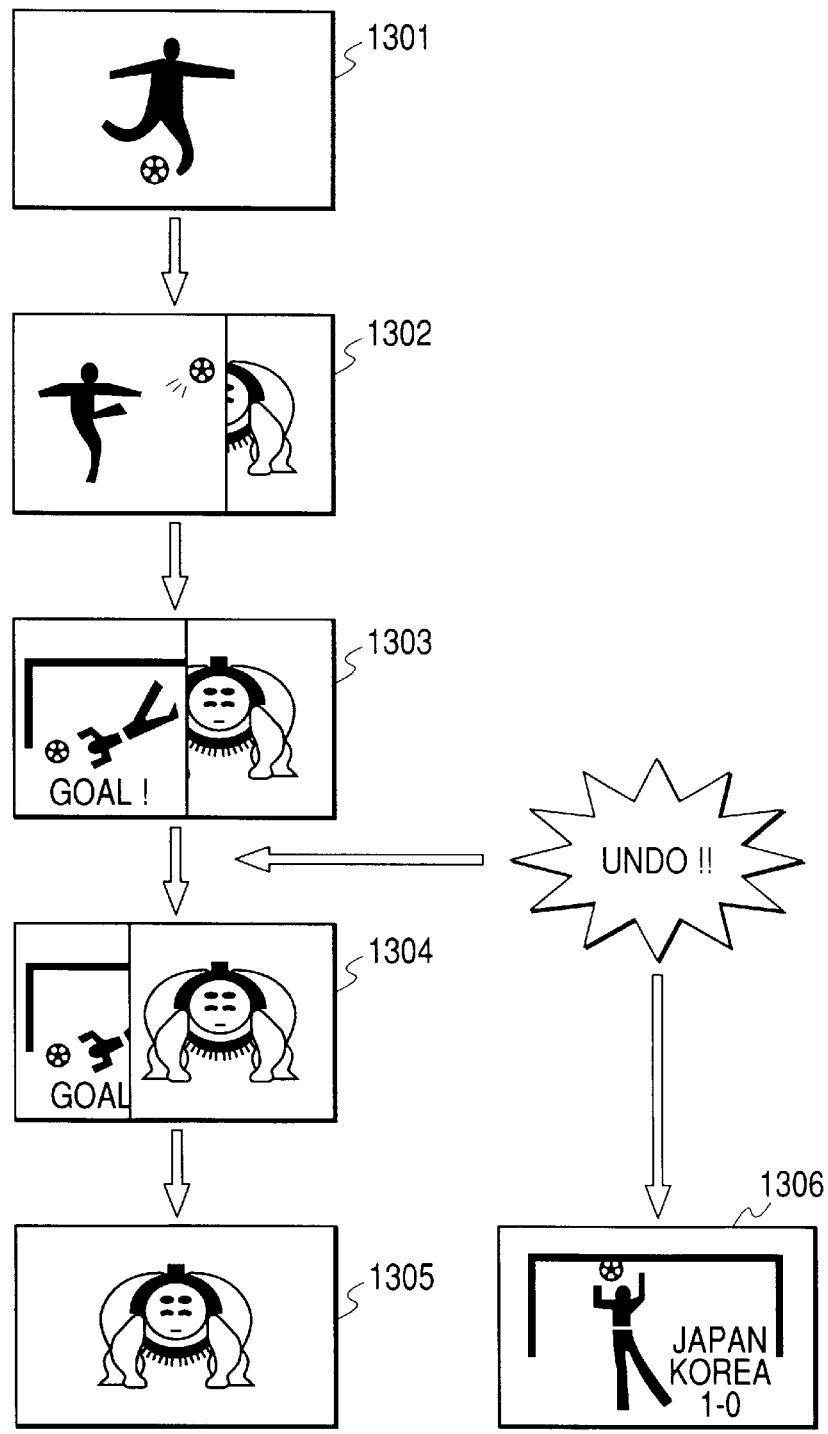
FIG. 13 is a diagram for explaining an UNDO action from a user using the automatic wipe change processing.

FIG. 13 is a diagram depicting a picture displayed on the sub-picture during the auto wipe change process when the wipe effect time is set relatively long through pictures denoted by reference numerals 1301 to 1306.

For example, it is assumed that the user is watching a soccer program on the sub-picture 222 as in the screen 1301. In this state, when the user uses the remote controller 117 to configure the auto wipe change mode in order to check other programs, the display state of the sub-picture 222 will change from the picture 1301 to 1302, to 1303, to 1304 and then to 1305.

Further, the video image displayed in the sub-picture is a moving image, and the content thereof is changing continuously during the wipe change period. For example, there is a possibility that, with the passage of time, the soccer program before the wipe change may change from a goal shot scene to an important scene such as the scene where the goal is scored, as shown in the screen 1303.

With a configuration where the change occurs instantaneously without performing the wipe change, there is possibility that important scenes will be missed. However, in the present embodiment, a configuration has been adopted in which the changing of the programs is performed with a wipe operation, in particular, making the wipe effect time longer (for example, 4 seconds) enables the user to check the program even when there was an important scene during the changing of the program.

Therefore, as depicted by the dotted line in FIG. 12, step S508 and step S513 have been provided in the auto wipe change process.

As shown in FIG. 12, at step S507 the wipe change processing is performed. At this time, when the user performs an UNDO (i.e., restore) operation with the remote controller 117, the command (i.e., request) is provided to the control unit 112 via the remote control photo-receiving unit 116. When the control unit 112 recognizes that there is an UNDO request made by the user (step S508), it controls the video processing unit 102 and the synthesization unit 109 to interrupt the wipe change processing, and executes processes for displaying the program that was being displayed before the wipe change processing, on the sub-picture (i.e., executes UNDO processes for resetting all functions to their states before the wipe process) (step S513), and then immediately escapes from the automatic wipe change mode.

In this way, when the user gives the UNDO instruction when the picture of 1303 in FIG. 13, for example, is being displayed on the sub-picture, then the sub-picture wipe change processes are interrupted, the procedures do not advance to the pictures 1304 to 1305, the processing quickly returns to the picture 1306 which is the original program, and the chance to see the important scene is not missed. The capacity to quickly return to the program that was being displayed before the change with the user's UNDO action at a time when the wipe change processing is being performed is a unique technological advantage of the present embodiment in which the wipe processing is applied when the programs are being changed.

In this way, according to the present embodiment, when the power is turned on, programs which are currently being broadcasted are searched and narrowed down in accordance with the user's profile, such as the user's preferences, viewing history, and the plurality of programs which are obtained as a result of the search and narrow-down are displayed on the multi-picture according to their degree of priority; therefore, when the user turns on the power the user can quickly check the kinds of programs he or she likes.

Further, in the case where the program being displayed in the sub-picture is changed, the wipe processing is performed on the picture before and after the change, and therefore, in the case where sub-pictures displayed at a relatively small size are switched it is easy for the user to recognize which picture was changed.

Additionally, when the programs of the sub-pictures are changed, the program which was extracted in advance as the candidate to switch into the sub-picture is received in advance when the user selects the sub-picture; therefore, the changing of the program can be executed in response to the program change command without delay.

Further, by providing the auto wipe change function, the user can check many other programs being broadcasted currently on different channels without him or herself having to give instructions to change the sub-pictures. Also, in the auto wipe change process it is possible to cancel the change with the UNDO action; therefore, even in the case where the image immediately preceding the change is an important scene, it is not missed.

According to the first embodiment of the present invention, the video processing unit 102D of the reception apparatus 100 in FIG. 1 is used as the processing system in common to the sub-pictures 222, 223, and this video processing unit 102D plus either of the two processing systems video processing unit 102B or video processing unit 102C is used (i.e., the double tuner) to achieve the process of changing the programs of the sub-picture 222 or 223.

However, for purposes of reducing apparatus or system costs, and because of other issues bearing on product planning, there could be cases in which the separate processing system such as the video processing unit 102D used in common to the sub-pictures 222, 223 would not possible, and it would be necessary to perform the program changing process at the time of the sub-picture wipe by a processing system used for only a sub-picture in question. Thus, in a second embodiment, explanation will be made of a program changing process performed by a single processing system, namely, "sub-picture wipe program changing operations with a single tuner".

In the second embodiment it is assumed that constitutive elements of the video processing unit 102A in the reception apparatus 100 of FIG. 1 constitute a processing system for the main picture 221, constitutive elements of the video processing unit 102B in the reception apparatus 100 constitute a processing system for the sub-picture 222 and constitutive elements of the video processing unit 102C in the reception apparatus 100 constitute a processing system for the sub-picture 223.

Also, the memory 8B of the processing system for the sub-picture 222 and the memory 8C of the processing system for the sub-picture 223 each have a memory size capable of storing enough video data for two picture images of a sub-picture; and memory control units 7B and 7C each have an independent, two-system output capable of simultaneously (in parallel fashion) outputting to the synthesization unit 109 the video data of the two picture images stored in memory 8B and 8C. Therefore, one set of image data from the memory control unit 7A, two sets of image data from the memory control unit 7B, and two sets of image data from the memory control unit 7C are provided to the synthesization unit 109, meaning that a total of five independent sets of video are provided to the synthesization unit 109. However, in this embodiment it is enough that four sets of independent image data can be processed simultaneously.

Figure 10:
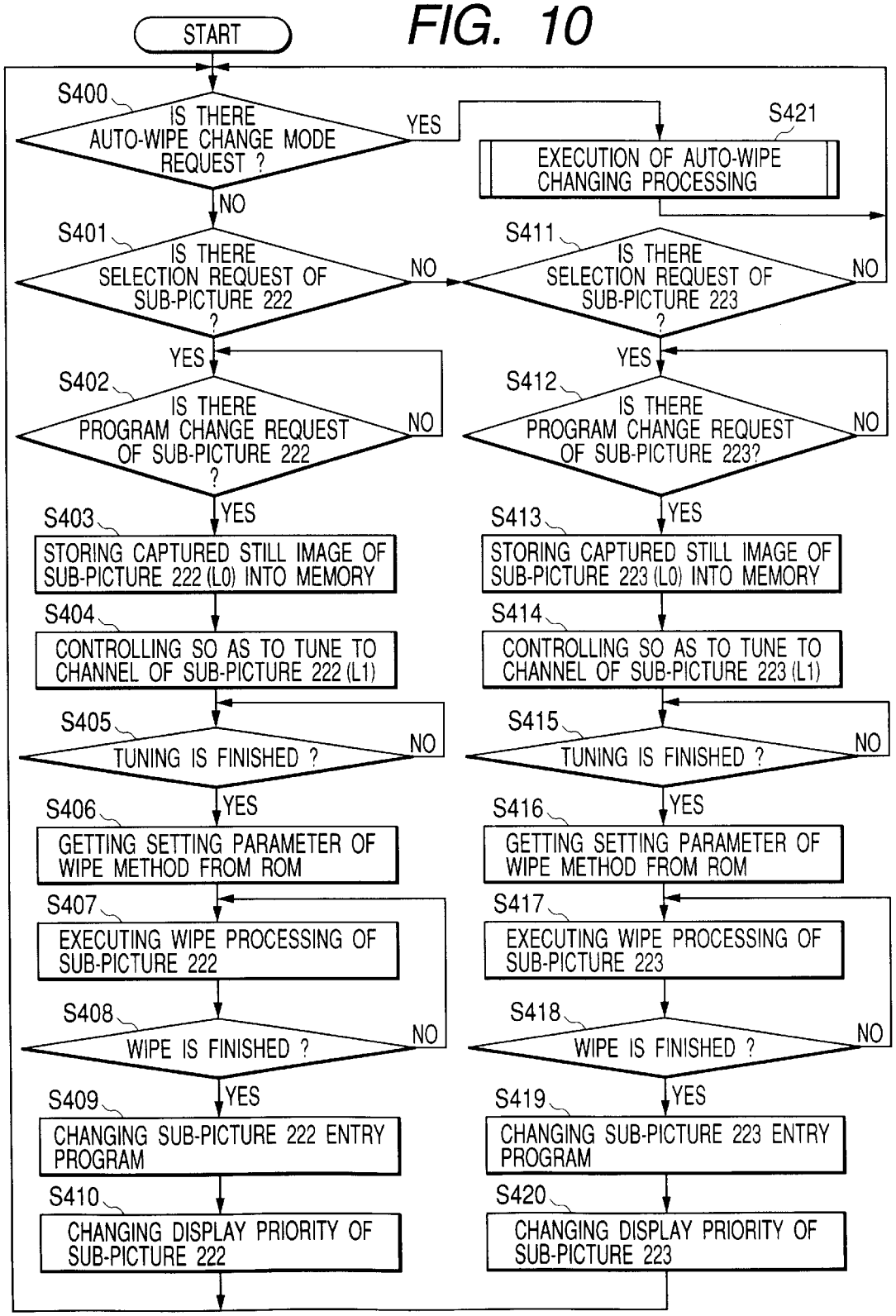
FIG. 10 is a flow chart for explaining the sub-picture wipe change processing using a single tuner.
Figure 11:
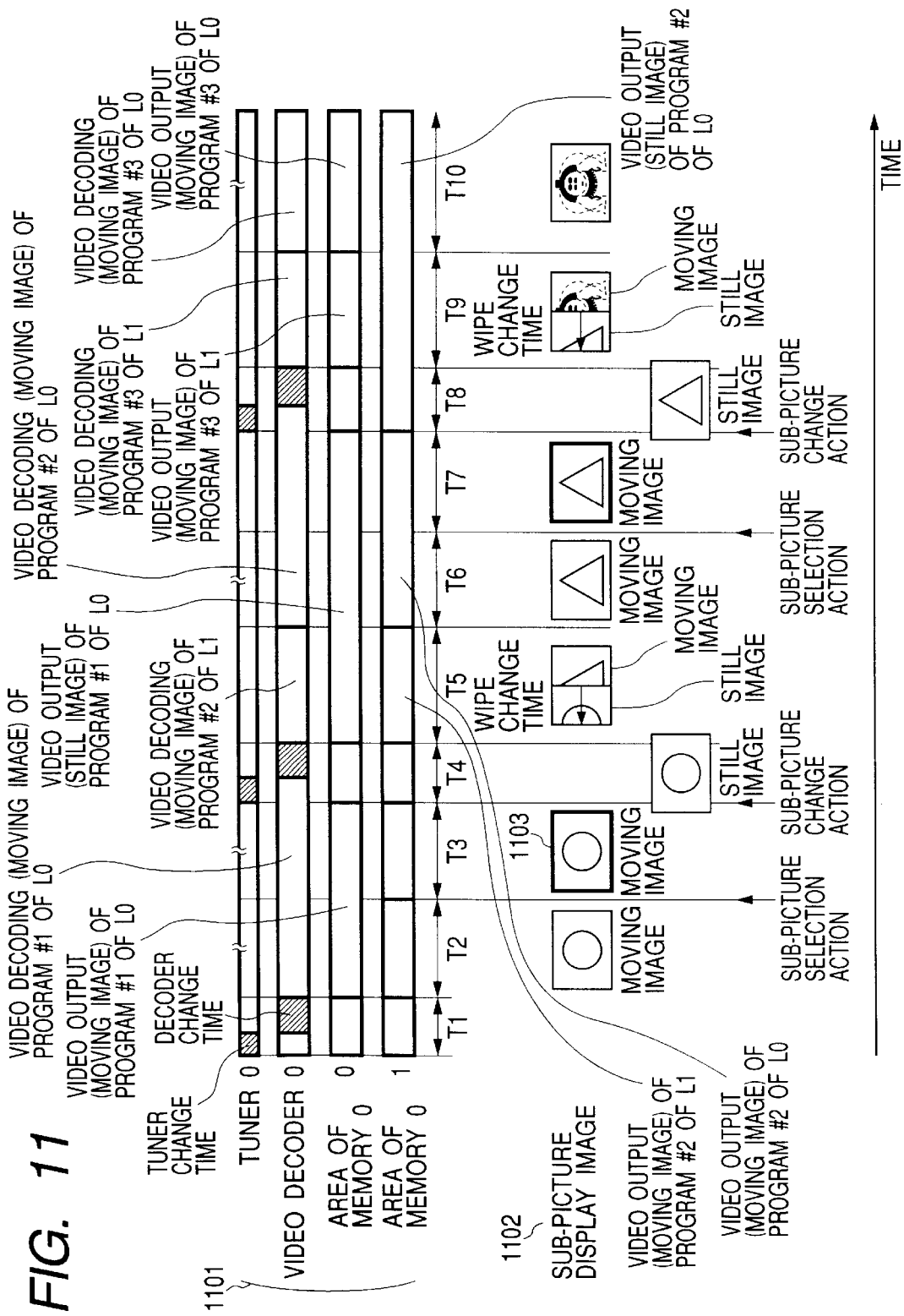
FIG. 11 is a diagram for explaining timing in a sub-picture wipe change processing using the single tuner.

FIG. 10 is a flow chart depicting operations of a control unit 112 according to the present embodiment at the time of changing the program on the sub-picture, and FIG. 11 is a timing chart for explaining the sub-picture wipe program change process according to present embodiment. Further, the basic processing of the reception apparatus 100, the initialization processing depicted in FIG. 3, the filing processing depicted in FIG. 6, for example, are the same as in the embodiment described above.

In the flow chart of FIG. 10, the points S400, S401, S411 and S412 where the flow of the procedure splits off based on various conditions indicate splits based on the conditions of user actions from the remote controller 117.

First, the control unit 112 determines whether the command received at the remote control photo-receiving unit 116 is a command produced by the user's depressing the auto-wipe change mode key on the remote controller 117 (i.e., whether it is for the auto wipe change mode) or not (step S400).

As a result of the determination made at step S400, in the case where the command is for the auto wipe change mode, the control unit 112 executes the auto-wipe changing processing (step S421), and then the processing returns to step S400 and repeats the processing steps following thereafter.

As a result of the determination made at step S400, in the case where the command is not for the auto-wipe change processing, then the control unit 112 makes a determination as to whether a command for a selection of the sub-picture 222 has been received at the remote control photo-receiving unit 116 from the remote controller 117 (i.e., whether there is a selection request of the sub-picture 222). As a result of this determination, in the case where a sub-picture 222 selection request has not been received, the control unit 112 makes a further determination as to whether a command for selection of the sub-picture 223 has been received from the remote controller 117 (i.e., whether there is a selection request of the sub-picture 223) or not (step S411).

As a result of the determinations made at step S401 and step S411, in the case where the selection request for neither the sub-picture 222 nor the sub-picture 223 has been received at the remote control photo-receiving unit 116, the process returns to step S400, and the steps following thereafter are repeated.

Further, as a result of the determination made at step S401, in the case where the selection request for the sub-picture 222 has been received at the remote control photo-receiving unit 116 the process then advances to the steps beginning from step S402; and on the other hand, in the case where the result of the determination made at step S411 is that the selection request for the sub-picture 223 has been received at the remote control photo-receiving unit 116, then the process advances to the steps beginning from step S412.

Hereinafter explanation will be made of processing beginning from step S402; however, the processing from step S402 to step S410 and the processing from step S412 to step S420 are only different from each other in that the sub-picture which is to be subjected to the processing is different, and the basic processing thereof is similar. Therefore, explanation will be made here of the processing from step S402 to step S410 only, and the processing from step S412 to step S420 will be omitted.

Here, explanation will now be made according to FIG. 1 and FIG. 11.

FIG. 11 is a timing chart depicting processing of the video processing unit 102 which takes place in connection with the channel change of the sub-picture 222 or the sub-picture 223. In FIG. 11, reference numeral 1101 denotes to processing of the video processing unit 102 for processing the channel data to be shown on either the sub-picture 222 or 223. Here, the processing of the video processing unit 102B, which is the processing system of the sub-picture 222, is depicted as an example.

Therefore, "tuner 0" in FIG. 11 corresponds to the tuner unit 2B, "video decoder 0" corresponds to the video decoder 5B, "region 0 of the memory 0" corresponds to the region 0 in the memory 8B, and "region 1 of the memory 0" corresponds to the region 1 in the memory 8B. Note that the memory 8B and 8C each have two memory regions of a region 0 and a region 1 and are capable of storing video data equivalent to one picture image of a sub-picture, and these two regions have different addresses to separate from each other.

In the initialization processing described above, after the power source is turned on and time T1 passes, which is equivalent to the sum of the time required for the tuner 0 (i.e., the tuner 2B) to change the channel plus the time required until the decoding is begun by the video decoder 0 (i.e., the video decoder 5B), then the video (i.e., moving picture) data for the program #1 stored in the region Sub1 (L0) of the RAM 114 is outputted from the memory 0 (i.e., the memory 8B).

Then, after time T2 passes, in the case where there is a selection request for the sub-picture 222 at step S401 then, according to the present embodiment, the channel pre-tuning processing such as that in the first embodiment is not performed, and the control unit 112 controls the GUI generation unit 115 to generate the data representing the frame 1103 on the sub-picture 222 of the display unit 111, and synthesizes this frame 1103 and the sub-picture 222 and displays the synthesization result. Then the control unit 112 waits for receiving of the command requesting a program change of the sub-picture 222, at the remote control photo-receiving unit 116 from the remote controller 117 (i.e., waits for the sub-picture 222 program change request) (step S402).

After the duration of time T3 elapses, when it has been confirmed that the command for the sub-picture 222 program change request has been received, then the memory control unit 7B performs controls for the following operations.

The memory control unit 7B stops the updating of the video data in the memory 8B (i.e., stops the writing of the video data to the memory 8B) while continuing to read out the video data from the memory 8B. In other words, the video data of the program #1 which is stored in the region 0 of the memory 8B at the time when the instructions for the sub-picture channel change are received is captured as a still image, and a still picture of the program #1 is displayed to the sub-picture 222.

Next, the control unit 112 controls the video processing unit 102B; which is the processing system of the sub-picture 222, in such a way that it receives in the RAM 114 the data of the channel containing the program #2 stored in region Sub1 (L1) for the sub-picture 222 (step S404).

After the instructions for the reception of the program #2 are made, and then time T4 elapses, which is a sum of the time required for the tuner 0 (i.e., the tuner unit 2B) to change the channel plus the time required until the decoding is begun by the video decoder 0 (i.e., the video decoder 5B), then the video decoder 0 (i.e., the video decoder 5B) outputs the image (i.e., moving image) data of the program #2 which is set in the region Sub1 (L1). Then, the memory control unit 7B writes the video data of this program #2 into the region 1 of the memory 8B, reads out the video data (i.e., the still screen) of the program #1 stored in the region 0 of the memory 8B and the video data (i.e., the moving image) of the program #2 stored in the region 1 of the memory 8B in parallel fashion and outputs them to the synthesization unit 109.

At this time the display priority relationship is "the output image from region 0 of the memory 0 (i.e., memory 8B region 0)>the output image from the region 1 of the memory 0 (i.e., memory 8B region 1)". Therefore, the video data read out from region 1 of the memory 8B is not displayed on the display unit 111.

The control unit 112 waits until the channel tuning process of step S404 is completed (step S405), then when it is confirmed that the channel tuning process has completed, the control unit 112 gets setting parameters of a wipe method stored in the ROM 113 in advance (step S406) and executes the wipe change processing of the sub-picture 222 in the same way as in the first embodiment (step S407).

Note that the difference between the first embodiment and the second embodiment in the wipe change processing at step S407 is, as shown by reference numeral 1102 os FIG. 11, that the output image from the region 0 of the memory 0 is pulled out to the left as being a still image, and the output image from the region 1 of the memory 0 is a moving image and appears in steps with the wipe display effect.

Then, after the duration of time T5 has elapsed, when the control unit 112 has confirmed that the wipe change processing has completed (step S408), it changes the sequence of the sub-picture 222 entry programs in the RAM 114 in a rotational fashion to:

Sub1 (L0)←Program #2
Sub1 (L1)←Program #3
Sub1 (L2)←Program #4
Sub1 (L3)←Program #5
Sub1 (L4)←Program #1 (step S409)

Further, the control unit 112 also changes the display priority for the sub-picture 222 to: "the output image from the region 1 of the memory 0>the output image from the region 0 of the memory 0" (step S410).

Then the process returns once again to step S400, and when there is a selection request for the sub-picture 222, the processing from step S401 through step S410 is repeated. The timing in this case is as shown in FIG. 11.

The execution of the processing steps explained above enables the wipe processing to be performed at the time of the sub-picture program wipe change during the multi-picture display, even in the single tuner case where only one tuner can be used at the time of the channel change, as in this embodiment.

Note that, since the auto-wipe changing processing of the second embodiment (i.e., step S421 of FIG. 10) could be explained in the same way, if the wipe changing processing explained with reference to FIG. 10 and FIG. 11 were applied to the auto-wipe changing processing of the first embodiment (i.e., step S319 of FIG. 7), the details thereof are omitted here.

Note that in the embodiment described above, a horizontal wipe processing is performed upon the program change; however, in addition to this a vertical type, for example, or a cross-fade processing, or other types of processing capable of achieving a transient effect can be adopted.

Note that an objective of the present embodiment is to provide a memory medium in which there is stored software program code for realizing the functions of the reception apparatus of FIG. 1, and this objective may be achieved by a computer (or CPU or MPU) of the system or apparatus which reads out and executes a program code stored in this memory medium.

In such a case, this program code which is read out from the memory medium realizes the functions of the embodiments of the present invention, and the memory medium which stores the program code constitutes the present invention.

For the memory medium for providing the program code, it is possible to use a ROM, floppy disk, hard disk, optical disk, magnetooptic disk, CD ROM, CDR, magnetic tape, non-volatile memory card or the like. Further, not only a case of executing the program code which is read out by the computer so that the functions of each of the embodiments are realized, but also a case of that the OS running on the computer, for example, performs a part of or the entirety of the actual processing based on the instructions of the program code so that the functions of the embodiments are realized, also constitute the present invention.

Additionally, the program code which is read out from the memory medium is written to the expansion function board inserted into the computer or to the memory provided in a function expansion unit which is connected to the computer, and then, the CPU or the like which is provided to the function expansion board or the function expansion unit performs either a part of or the entirety of the actual processing based on the instructions of the program code, thereby realizing the functions of the embodiments. This case also constitutes the present invention.

According to the embodiments of the present invention as described above, a construction is adopted such that when the channel is changed, a predetermined period of time is provided to synthesize the image of the channel before the channel change and the image of the channel after the channel change and display the synthesized image; therefore, in the multi-picture comprising the main picture and the sub-pictures, it is easy to visually recognize on which picture the channel change has occurred.

For example, in the case of the multi-picture having the main picture and a plurality of sub-pictures, when the user provides optional channel change instructions for the sub-picture, there is provided a transition period on the sub-picture including a constant wipe effect, and during this transition period the images of the channels before and after the channel change are synthesized while the image change is being performed. As a result, the user can easily recognize which sub-picture channel in the multi-picture has been changed. At this time it is also possible to perform the display with the number of sub-pictures which is decreased as necessary in order to secure sufficient recognizability.

Further, the present invention is so constructed that the number of channels which may be selected is narrowed down through filtering based on the user's profile (i.e., the user's preferences, viewing history, and other such information), priority are attached to the channels which have been obtained by narrowing down, and a channel is selected from among the registered channels; therefore, immediately after the power source is turned on the user can quickly tune in his or her desired channel, and can select channels by viewing them directly while viewing the screen even in the case of a multiple channel digital broadcast, just as in the case of an analog broadcast.

Further, the present invention is also constructed so that it is possible to modify the predetermined duration of time that is required to switch from the image before the channel change to the image after the channel change; therefore, it is possible to improve operability and ease of viewing.

Further, the present invention is also constructed so such that the synthesized image comprised of the image before the channel change and the image after the channel change is returned to the image before the channel change (i.e., UNDO) according to instructions from the user; therefore, the user can view the image of the desired channel without missing an important scene, for example.

Further, the present invention is also constructed so that when the image before the channel change and the image after the channel change are synthesized, if the image before the channel change and the image after the channel change are both made to be moving pictures, or if either the image before the channel change or the image after the channel change is made to be a still picture, then it is possible to achieve an optimum configuration such as a change between a moving picture and a moving picture (i.e., wipe-change) in the case where the apparatus or system has a double-tuner construction, or a change between a still picture and a moving picture in the case where the apparatus or system can be arranged with only a single-tuner construction; hence, the present invention effective to any kind of apparatus or system construction.

Therefore, according to each of the embodiments of the present invention, even a multi-channel broadcast is easy for the user to view, the picture images of television broadcasts which are received with multi-picture display can be displayed efficiently, and the operability of the user's channel tuning and the like are improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for receiving a television signal having a plurality of channels comprising:
    a reception means for receiving the television signal; and
    a control means for, according to an instruction for channel change from a first channel to a second channel, synthesizing an image of the first channel and an image of the second channel and displaying the synthesized image on a picture by a display apparatus within a predetermined duration of time.

2. An apparatus according to claim 1, wherein the control means assigns images of different channels included in the television signal to a main picture and a sub-picture, and wherein the synthesized image is displayed in the sub-picture.

3. An apparatus according to claim 1, wherein a display screen of the display apparatus includes one main picture and a plurality of sub-pictures.

4. An apparatus according to claim 1, further comprising storing means for storing a plurality of bodies of program information to each of which a priority is given, wherein the control means assigns two channels selected on the basis of the bodies of information stored in the storing means to the first and second channels, respectively.

5. An apparatus according to claim 1, wherein at least one of the image of the first channel and the image of the second channel is a still image.

6. An apparatus according to claim 1, wherein the control means controls the display apparatus in accordance with an instruction from a user so as to change a display state of the display apparatus from a display state of the synthesized image to a display state of only the image of the first channel.

7. An apparatus for receiving a television signal having a plurality of channels and assigning images of different channels included in the television signal to a main picture and a sub-picture, comprising:

reception means for receiving the television signal;

search means for extracting channels which match predetermined conditions, from the plurality of the channels included in the television signal received by the reception means; and control means for automatically and sequentially changing the channel of the sub-picture to another channel extracted by the search means at a predetermined timing, while synthesizing the images of the channels displayed on the sub-picture within a predetermined duration of time.

8. An apparatus according to claim 2, further comprising search means for searching for a desired program from among a plurality of programs included in the television signal received by the reception means, and instruction means for instructing that a power source be turned out, wherein the control means, in response to an instruction provided by said instruction means to turn on the power supply, select a program which corresponds to the result of the search means, and controls a processing means so as to output to the display means an image signal of the selected program.

9. An apparatus according to claim 8, wherein the search means effects search by using viewing history of a user as a third condition.

10. A television signal display method of displaying an image obtained from a received television signal on a screen, comprising:

a receiving step, of receiving the television signal;

a video signal obtaining step, of obtaining a video signal from the television signal received in the receiving step;

a display step, of displaying a picture based on the video signal obtained in the video signal obtaining step; and an instruction step, of instructing to change a channel, wherein the display step includes a switching step, of, in accordance with the instruction provided in the instruction step, displaying on a same screen for a predetermined time a synthesized image in which a video image of a first channel prior to channel change and video image of a second channel change which is post-channel change screen.

11. A method according to claim 10, wherein said display step includes a step of, on the basis of the channel change instruction to the sub-picture of a display picture which includes a main picture and the sub-picture, effecting the display of the synthesized image onto the sub-picture by causing a selected channel among a plurality of predetermined channels to be the first channel and the second channel.

12. A method according to claim 11, further comprising a registration step, of registering information relating to the plurality of predetermined channels, wherein the first and second channels include a channel which is based on an order of registration in the registration step.

13. A method according to claim 12, wherein the registration step includes using priority information which is based on channel information input by a user, and includes a step of registering the channel on the basis of the priority information.

14. A method according to claim 10, wherein the switching step includes effecting change of a video image in accordance with wipe change.

15. A method according to claim 10, wherein the video image of the first channel and the video image of the second channel are both moving images, and wherein the switching step includes effecting tuning control of the second channel in advance.

* * * * *

UNITED STATES PATENT AND TRADEMARK OFFICE
CERTIFICATE OF CORRECTION

PATENT NO. : 6,795,125 B2 Page 1 of 1
DATED : September 21, 2004
INVENTOR(S) : Hideaki Yui It is certified that error appears in the above-identified patent and that said Letters Patent is hereby corrected as shown below:

Column 1,
Line 15, "divided" should read -- dividing --.

Column 3,
Line 36, "an video" should read -- a video --.
Line 62, "currection" should read -- correction --.

Column 8,
Line 67, "not" should read -- no --.

Column 10,
Line 18, "using" should read -- Using --.

Column 17,
Line 55, "possible," should read -- be possible, --.

Column 20,
Line 39, "os" should read -- of --.

Column 22,
Line 35, "effective" should read -- is effective --.

Column 23,
Line 38, "select" should read -- selects --.

Signed and Sealed this

Twenty-first Day of December, 2004

JON W. DUDAS
*Director of the United States Patent and Trademark Office*